US009336751B2

(12) United States Patent
Tsukagoshi et al.

(10) Patent No.: US 9,336,751 B2
(45) Date of Patent: May 10, 2016

(54) IMAGE PROCESSING SYSTEM, APPARATUS, AND METHOD AND MEDICAL IMAGE DIAGNOSIS APPARATUS

(75) Inventors: Shinsuke Tsukagoshi, Nasushiobara (JP); Takumi Hara, Akishima (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 345 days.

(21) Appl. No.: 13/553,283

(22) Filed: Jul. 19, 2012

(65) Prior Publication Data

US 2013/0181979 A1    Jul. 18, 2013

(30) Foreign Application Priority Data

Jul. 21, 2011    (JP) ................................. 2011-160071

(51) Int. Cl.
*G06T 15/00* (2011.01)
*G09G 5/14* (2006.01)
*H04N 13/02* (2006.01)
*H04N 13/04* (2006.01)

(52) U.S. Cl.
CPC ............. *G09G 5/14* (2013.01); *H04N 13/0275* (2013.01); *H04N 13/045* (2013.01); *H04N 13/0438* (2013.01); *H04N 13/0447* (2013.01)

(58) Field of Classification Search
CPC ..... G06T 13/20; G06T 19/20; G06T 2210/41; G06T 2219/2012; G09G 5/14; H04N 13/0275; H04N 13/0438; H04N 13/0447; H04N 13/045
See application file for complete search history.

(56) References Cited

U.S. PATENT DOCUMENTS

| 7,567,648 | B2* | 7/2009 | Tsubaki et al. ................. 378/41 |
| 2002/0030888 | A1* | 3/2002 | Kleinberger et al. ......... 359/465 |
| 2003/0048354 | A1* | 3/2003 | Takemoto et al. .............. 348/51 |
| 2010/0110068 | A1* | 5/2010 | Yamauchi .......... H04N 13/0445 345/419 |

FOREIGN PATENT DOCUMENTS

| CN | 102833570 A | 12/2012 |
| JP | 2005-86414 | 3/2005 |
| JP | 2005-223727 | 8/2005 |

OTHER PUBLICATIONS

Machine Translated Japanese Patent applcation, Hashimoto et al., JP,2006-101329.*
Machine Translated Japanese Patent application, Kitamura, JP,2010-250457.*
Machine translated: Japanese Patent Application JP,2001-155151.*
Machine translated: Japanese Patent Application JP,2008-113800.*
Office Action issued Apr. 28, 2015 in Japanese Patent Application No. 2011-160071.
Office Action issued Feb. 28, 2015 in Chinese Patent Application No. 201210247547.2.

* cited by examiner

*Primary Examiner* — Sing-Wai Wu
(74) *Attorney, Agent, or Firm* — Oblon, McClelland, Maier & Neustadt, L.L.P.

(57) ABSTRACT

In an image processing system according to an embodiment, a display unit simultaneously displays a predetermined number of parallax images. A parallax image generation control unit performs control such that a group of parallax images of point-of-view positions which are larger in number than the predetermined number is generated. A display control unit classifies the group of the parallax images into a first parallax image sub group including a set of parallax images whose point-of-view positions are discontinuous to each other and a second parallax image sub group including parallax images whose point-of-view positions are between the set of the parallax images, and performs control such that the display unit displays the first parallax image sub group and the second parallax image sub group while switching the first parallax image sub group and the second parallax image sub group at a predetermined switching speed.

7 Claims, 16 Drawing Sheets

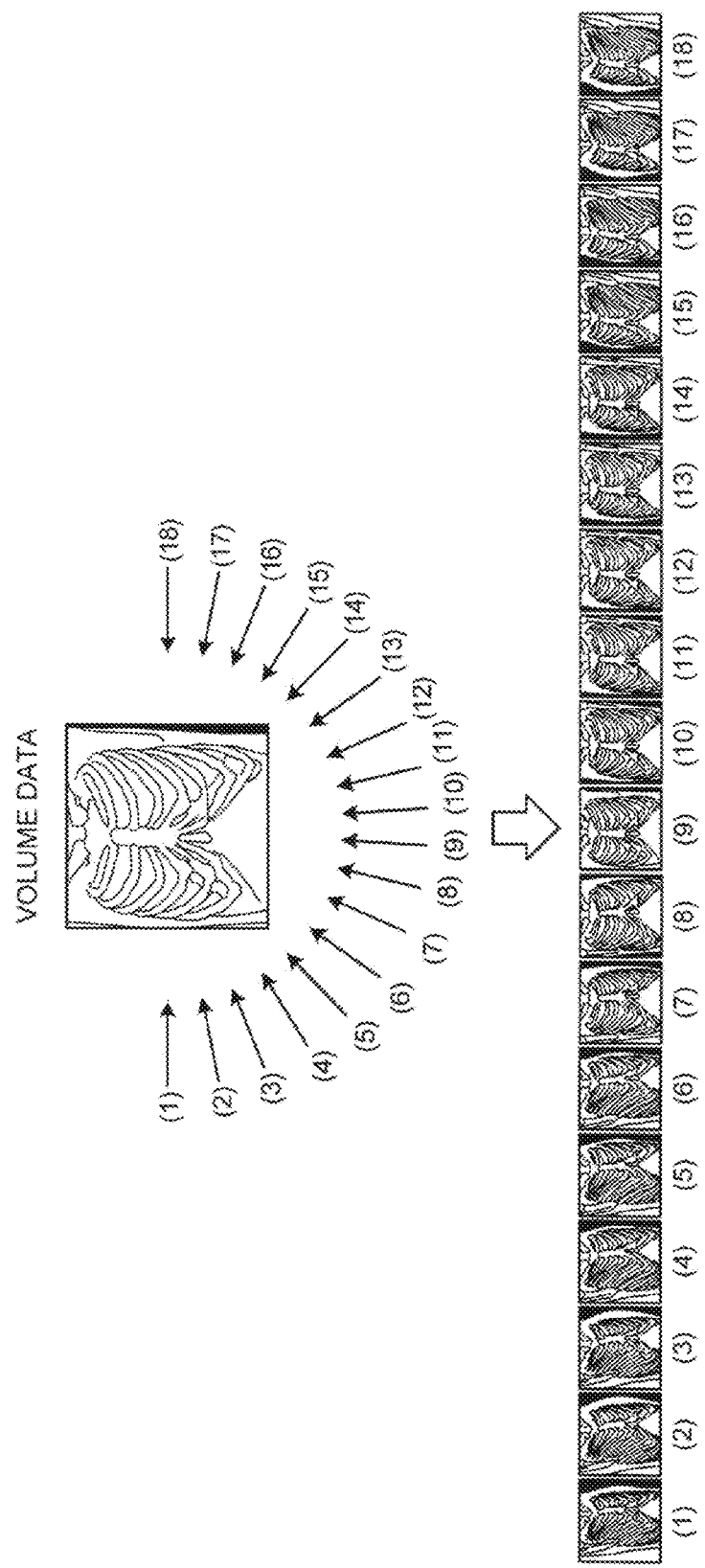

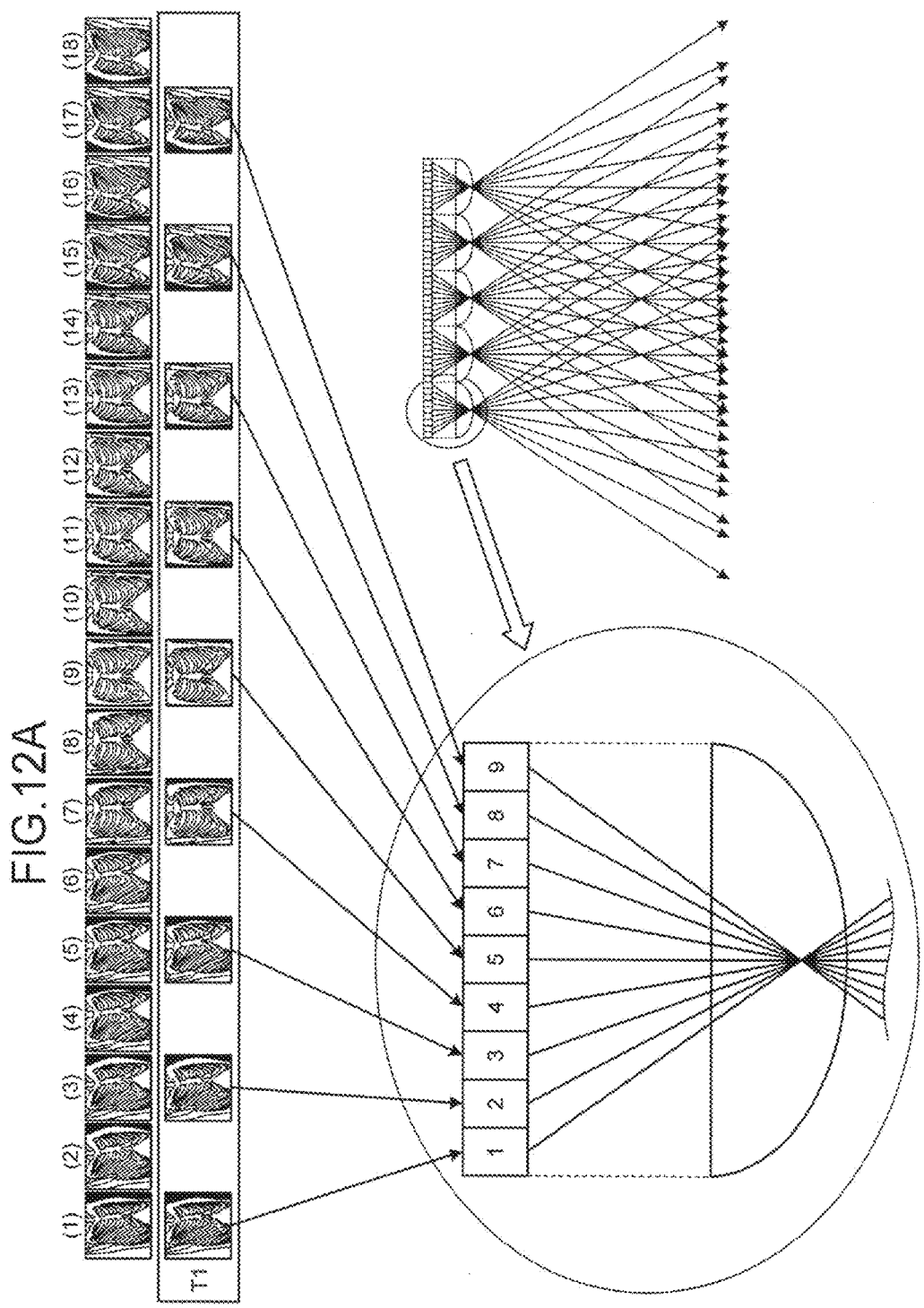

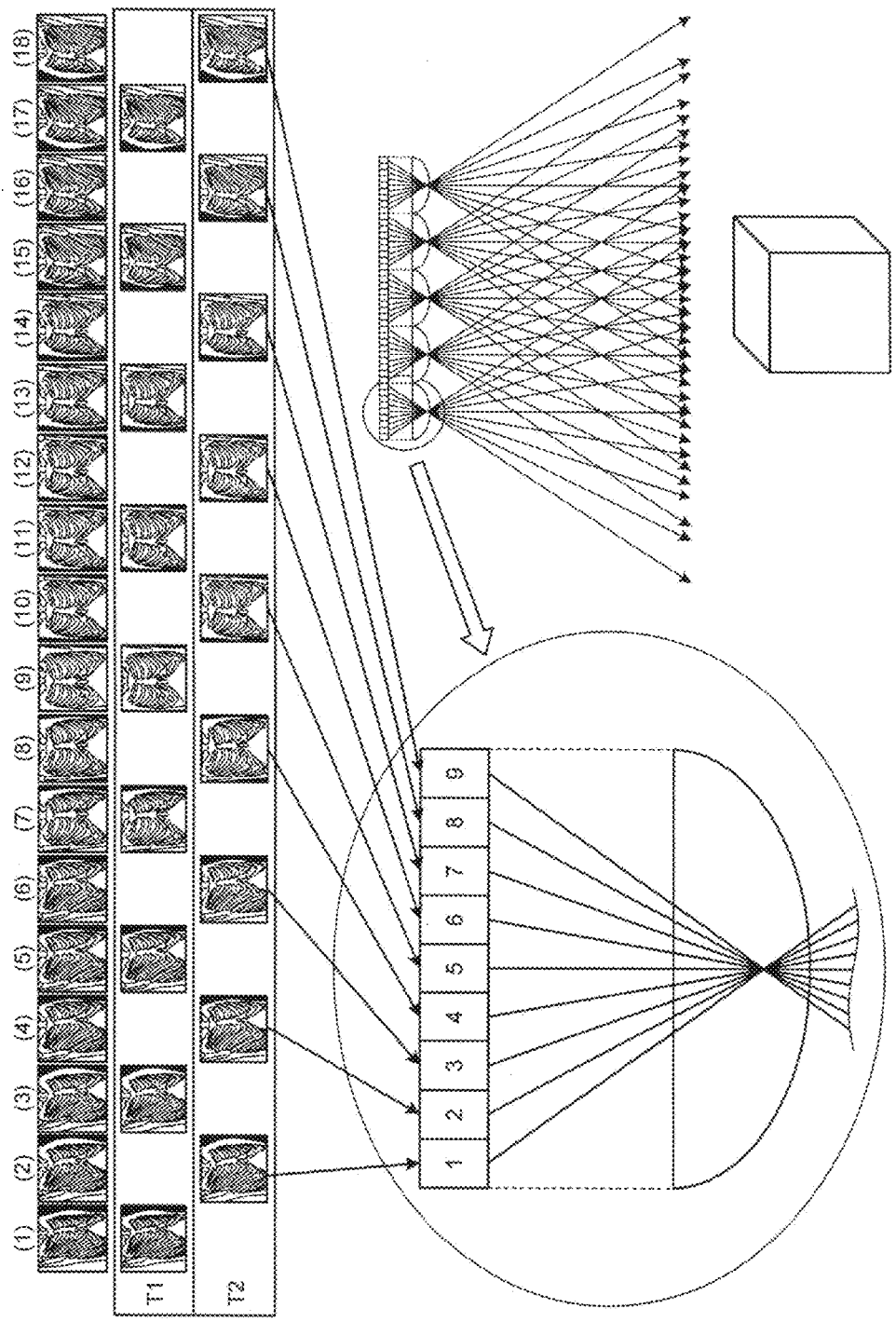

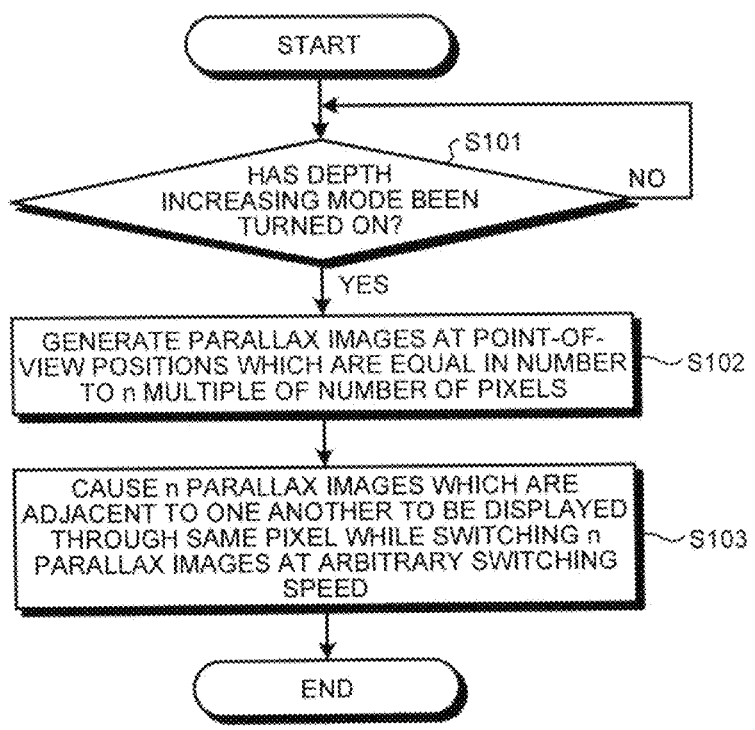

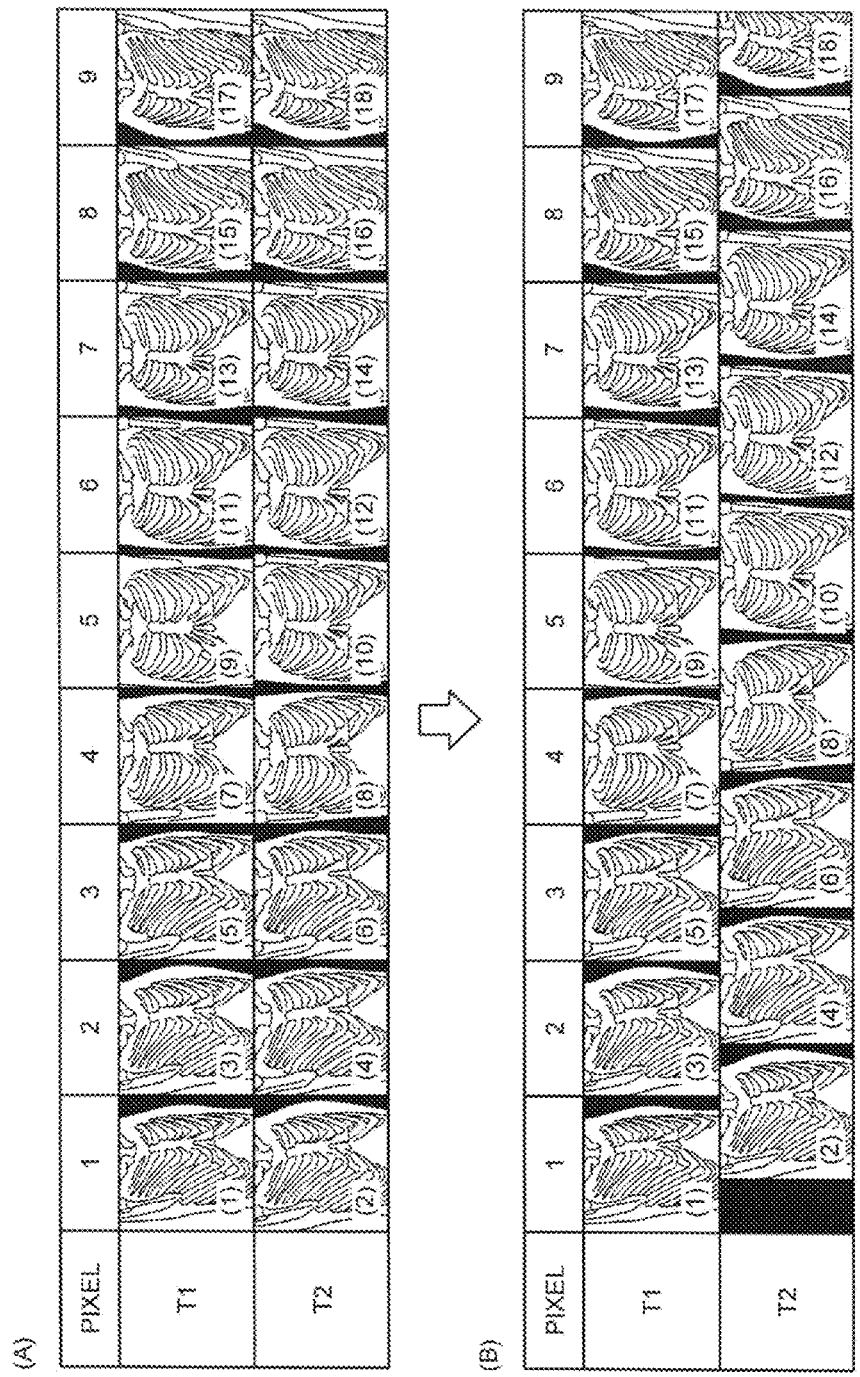

FIG.15

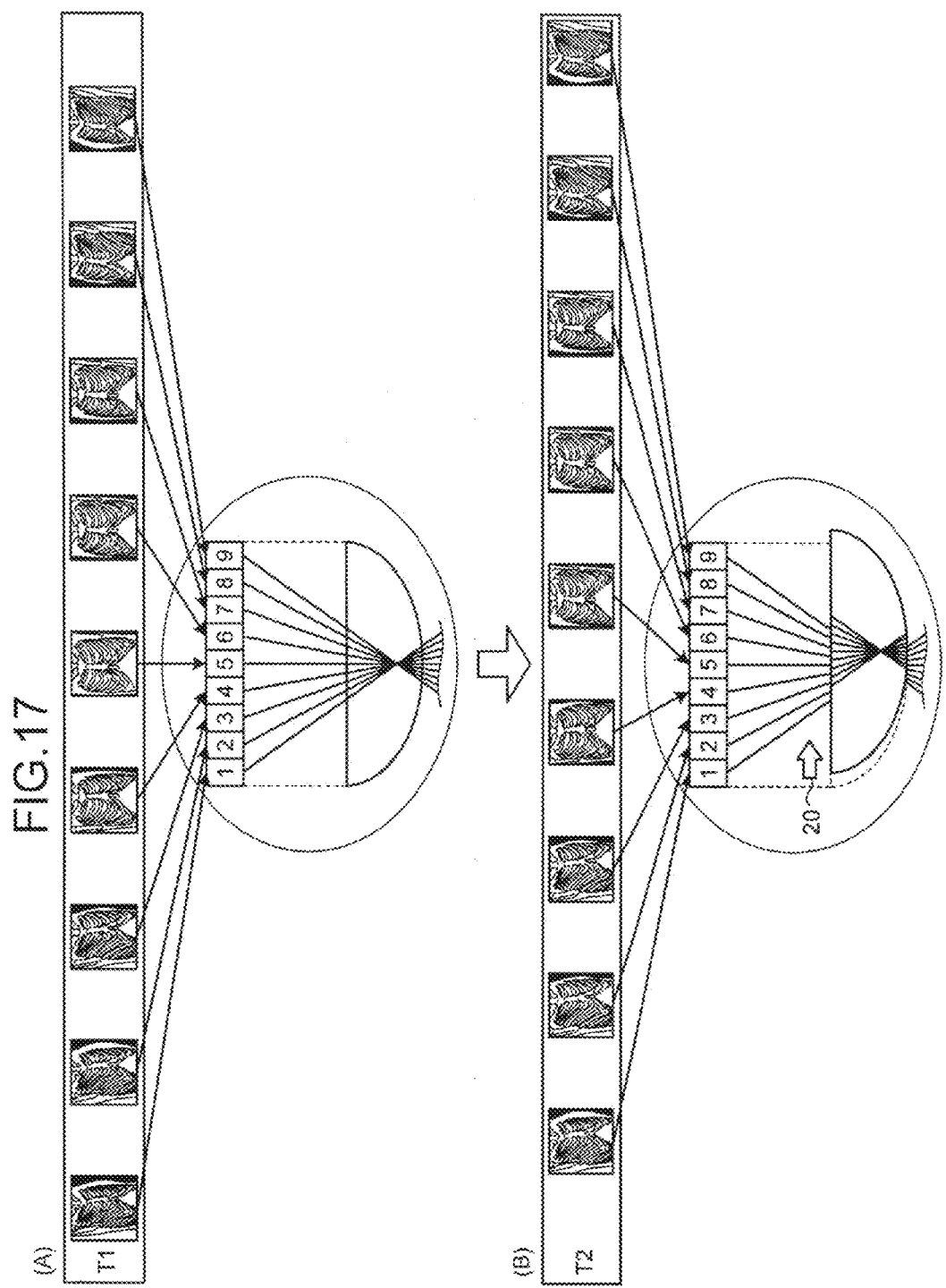

US 9,336,751 B2

IMAGE PROCESSING SYSTEM, APPARATUS, AND METHOD AND MEDICAL IMAGE DIAGNOSIS APPARATUS

CROSS-REFERENCE TO RELATED APPLICATIONS

This application is based upon and claims the benefit of priority from Japanese Patent Application No. 2011-160071, filed on Jul. 21, 2011; the entire contents of which are incorporated herein by reference.

FIELD

Embodiments described herein relate generally to an image processing system, apparatus, and method, and a medical image diagnosis apparatus.

BACKGROUND

Conventionally, monitors enabling an observer to view two-parallax images captured from two viewpoints stereoscopically by using a specific device, such as a pair of stereoscopic vision glasses, have been in practical use. Furthermore, in recent years, monitors enabling an observer to view multi-parallax images (e.g., nine-parallax images) captured from a plurality of viewpoints stereoscopically with the naked eyes by using a beam control element, such as a lenticular lens, have also been in practical use. Such two-parallax images and nine-parallax images displayed on monitors enabling stereoscopic vision may be generated by estimating depth information of an image captured from one viewpoint and performing image processing with the information thus estimated.

As for medical image diagnosis apparatuses, such as X-ray computed tomography (CT) apparatuses, magnetic resonance imaging (MRI) apparatuses, and ultrasound diagnosis apparatuses, apparatuses capable of generating three-dimensional medical image data (hereinafter, referred to as volume data) have been in practical use. Conventionally, volume data generated by such a medical image diagnosis apparatus is converted into a two-dimensional image by various types of image processing, and is displayed two-dimensionally on a general-purpose monitor. For example, volume data generated by a medical image diagnosis apparatus is converted into a two-dimensional image that reflects three-dimensional information by volume rendering processing, and is displayed two-dimensionally on a general-purpose monitor.

In the conventional technology, however, there is a certain limit to a degree of the depth of the stereoscopically viewable image.

BRIEF DESCRIPTION OF THE DRAWINGS

FIG. 11 is a diagram for describing an example of a process performed by a rendering control unit according to the first embodiment;

FIG. 12A is a diagram for describing an example of a first display process performed by a display control unit according to the first embodiment;

FIG. 12B is a diagram for describing an example of a second display process performed by a display control unit according to the first embodiment;

FIG. 13 is a flow chart illustrating a procedure of a process performed by a workstation according to the first embodiment;

FIG. 14 is a schematic view for describing an outline of a process executed by a display control unit according to a second embodiment;

FIG. 15 is a diagram for describing an example of a process performed by a display control unit according to the second embodiment;

FIG. 17 is a diagram for describing deviation correction by sliding a lenticular lens according to a third embodiment.

DETAILED DESCRIPTION

According to an embodiment, an image processing system includes a display unit, a parallax image generation control unit and a display control unit. The display unit configured to simultaneously display a predetermined number of parallax image. The parallax image generation control unit configured to perform control such that a group of parallax images of point-of-view positions which are larger in number than the predetermined number is generated. The display control unit configured to classify the group of the parallax images generated by control of the parallax image generation control unit into a first parallax image sub group including a set of parallax images whose point-of-view positions are discontinuous to each other and a second parallax image sub group including parallax images whose point-of-view positions are between the set of the parallax images, and perform control such that the display unit displays the first parallax image sub group and the second parallax image sub group while switching the first parallax image sub group and the second parallax image sub group at a predetermined switching speed.

Hereinafter, embodiments of an image processing system, apparatus, and method will be described in detail with reference to the accompanying drawings. In the following, an image processing system including a workstation with a function as an image processing apparatus is described as an embodiment. Here, the terminology used in the following embodiments is described. A "parallax image group" refers to an image group which is generated by performing a volume rendering process on volume data while moving a point-of-view position by a predetermined parallactic angle at a time. In other words, the "parallax image group" is configured with a plurality of "parallax images" having different "point-of-view positions." Further, a "parallactic angle" refers to an angle determined by an adjacent point-of-view position among point-of-view positions set to generate the "parallax image group" and a predetermined position in a space (the center of a space) represented by volume data. Further, a "parallax number" refers to the number of "parallax images" necessary to implement a stereoscopic view by a stereoscopic display monitor. Further, a "nine-parallax image" described in the following refers to a "parallax image group" consisting of nine "parallax images." Furthermore, a "two-parallax image" described in the following refers to a "parallax image group" consisting of two "parallax images."

First Embodiment

Figure 1:
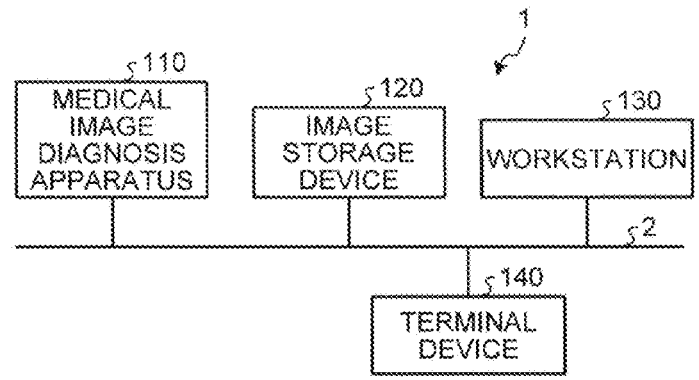
FIG. 1 is a diagram for describing a configuration example of an image processing system according to a first embodiment.

First, a configuration example of an image processing system according to a first embodiment will be described. FIG. 1 is a diagram for explaining an exemplary configuration of an image processing system according to a first embodiment.

As illustrated in FIG. 1, an image processing system 1 according to the first embodiment includes a medical image diagnosis apparatus 110, an image storage device 120, a workstation 130, and a terminal device 140. The respective devices illustrated in FIG. 1 are connected to directly or indirectly communicate one another, for example, via a hospital Local Area Network (LAN) 2 installed in a hospital. For example, when a Picture Archiving and Communication System (PACS) is introduced into the image processing system 1, the respective devices exchange a medical image or the like with one another according to a Digital Imaging and Communications in Medicine (DICOM) standard.

The image processing system 1 generates a parallax image group from volume data, which is three-dimensional medical image data, generated by the medical image diagnosis apparatus 110, and displays the parallax image group on a monitor enabling stereoscopic vision. Thus, the image processing system 1 provides a medical image capable of being viewed stereoscopically to a doctor or a laboratory technician who works for the hospital. Specifically, in the first embodiment, the workstation 130 performs various types of image processing on volume data to generate a parallax image group. The workstation 130 and the terminal device 140 have a monitor enabling stereoscopic vision, and display the parallax image group generated by the workstation 130 on the monitor. The image storage device 120 stores therein the volume data generated by the medical image diagnosis apparatus 110 and the parallax image group generated by the workstation 130. In other words, the workstation 130 and the terminal device 140 acquire the volume data and the parallax image group from the image storage device 120 to process the volume data and to display the parallax image group on the monitor. The devices will be explained below in order.

The medical image diagnosis apparatus 110 is an X-ray diagnosis apparatus, an X-ray Computed Tomography (CT) apparatus, a Magnetic Resonance Imaging (MRI) apparatus, an ultrasonic diagnostic device, a Single Photon Emission Computed Tomography (SPECT) device, a Positron Emission computed Tomography (PET) apparatus, a SPECT-CT apparatus in which a SPECT apparatus is integrated with an X-ray CT apparatus, a PET-CT apparatus in which a PET apparatus is integrated with an X-ray CT apparatus, a device group thereof, or the like. The medical image diagnosis apparatus 110 according to the first embodiment can generate 3D medical image data (volume data).

Specifically, the medical image diagnosis apparatus 110 according to the first embodiment captures a subject, and generates volume data. For example, the medical image diagnosis apparatus 110 generates volume data such that it collects data such as projection data or an MR signal by capturing a subject, and then reconstructs medical image data including a plurality of axial planes along a body axis direction of a subject based on the collected data. The medical image diagnosis apparatus 110 reconstructs medical image data of 500 axial planes, for example. The medical image data group of 500 axial planes corresponds to volume data. Alternatively, projection data or an MR signal of a subject captured by the medical image diagnosis apparatus 110 may be used as volume data.

The medical image diagnosis apparatus 110 according to the first embodiment transmits the generated volume data to the image storage device 120. When the medical image diagnosis apparatus 110 transmits the volume data to the image storage device 120, the medical image diagnosis apparatus 110 transmits supplementary information such as a patient ID identifying a patient, an inspection ID identifying an inspection, a apparatus ID identifying the medical image diagnosis apparatus 110, and a series ID identifying single shooting by the medical image diagnosis apparatus 110, for example.

The image storage device 120 is a database that stores a medical image. Specifically, the image storage device 120 according to the first embodiment stores volume data transmitted from the medical image diagnosis apparatus 110 in a storage unit to store the volume data therein. Further, in the first embodiment, the workstation 130 generates a parallax image group based on the volume data, and transmits the generated parallax image group to the image storage device 120. Thus, the image storage device 120 stores a parallax image group transmitted from the workstation 130 in the storage unit to store the parallax image group therein. Further, in the present embodiment, the workstation 130 capable of storing a large amount of images may be used, and in this case, the image storage device 120 illustrated in FIG. 1 may be incorporated with the workstation 130 illustrated in FIG. 1. In other words, in the present embodiment, the volume data or the parallax image group may be stored in the workstation 130.

Further, in the first embodiment, the volume data or the parallax image group stored in the image storage device 120 is stored in association with the patient ID, the inspection ID, the apparatus ID, the series ID, and the like. Thus, the workstation 130 or the terminal device 140 performs a search using the patient ID, the inspection ID, the apparatus ID, the series ID, or the like, and acquires necessary volume data or a necessary parallax image group from the image storage device 120.

The workstation 130 is an image processing apparatus that performs image processing on a medical image. Specifically, the workstation 130 according to the first embodiment performs various types of rendering processing on the volume data acquired from the image storage device 120 to generate a parallax image group. The parallax image group is a plurality of parallax images captured from a plurality of viewpoints. A parallax image group displayed on a monitor enabling an observer to view nine-parallax images stereoscopically with the naked eyes is nine parallax images whose viewpoint positions are different from one another.

The workstation 130 according to the first embodiment includes a monitor enabling stereoscopic vision (hereinafter, referred to as a stereoscopic display monitor) as a display unit. The workstation 130 generates a parallax image group, and displays the parallax image group thus generated on the stereoscopic display monitor. As a result, an operator of the workstation 130 can perform an operation for generating the parallax image group while checking a medical image that is displayed on the stereoscopic display monitor and capable of being viewed stereoscopically.

The workstation 130 transmits the parallax image group thus generated to the image storage device 120. When transmitting the parallax image group to the image storage device 120, the workstation 130 transmits the patient ID, the examination ID, the apparatus ID, and the series ID, for example, as additional information. Examples of the additional information transmitted when the workstation 130 transmits the parallax image group to the image storage device 120 include additional information related to the parallax image group. Examples of the additional information related to the parallax image group include the number of parallax images (e.g., "nine") and the resolution of the parallax image (e.g., "466× 350 pixels").

To generate and display multi-parallax images sequentially, the workstation 130 according to the first embodiment generates and displays parallax images of different parallax positions alternately between continuous time-phase data. As a result, the workstation 130 can display sequential multi-parallax images smoothly even if the sequential multi-parallax images are generated and displayed in real time. This operation will be described later in detail.

The terminal device 140 is a device that allows a doctor or a laboratory technician who works in the hospital to view a medical image. Examples of the terminal device 140 include a Personal Computer (PC), a tablet-type PC, a Personal Digital Assistant (PDA), and a portable telephone, which are operated by a doctor or a laboratory technician who works in the hospital. Specifically, the terminal device 140 according to the first embodiment includes a stereoscopic display monitor as a display unit. Further, the terminal device 140 acquires a parallax image group from the image storage device 120, and causes the acquired parallax image group to be displayed on the stereoscopic display monitor. As a result, a doctor or a laboratory technician who is an observer can view a stereoscopically viewable medical image.

Here, the stereoscopic display monitor included in the workstation 130 or the terminal device 140 will be described. A general-purpose monitor which is currently most widely used two dimensionally displays a two-dimensional (2D) image and hardly performs a 3D display on a 2D image. If an observer desires a stereoscopic view to be displayed on the general-purpose monitor, a device that outputs an image to the general-purpose monitor needs to parallel-display a two-parallax image stereoscopically viewable to an observer through a parallel method or an intersection method. Alternatively, a device that outputs an image to the general-purpose monitor needs to display an image stereoscopically viewable to an observer through a color-complementation method using glasses in which a red cellophane is attached to a left-eye portion and a blue cellophane is attached to a right-eye portion.

Meanwhile, there are stereoscopic display monitors that allow a two-parallax image (which is also referred to as a "binocular parallax image") to be stereoscopically viewed using a dedicated device such as stereoscopic glasses.

Figure 2A:
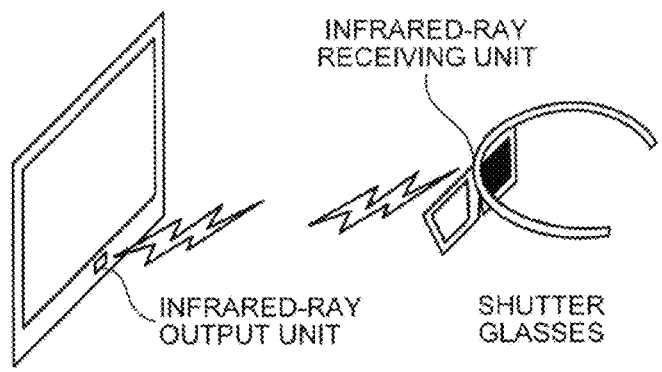
FIGS. 2A and 2B are diagrams for describing an example of a stereoscopic display monitor that performs a stereoscopic display based on a two-parallax image.
Figure 2B:
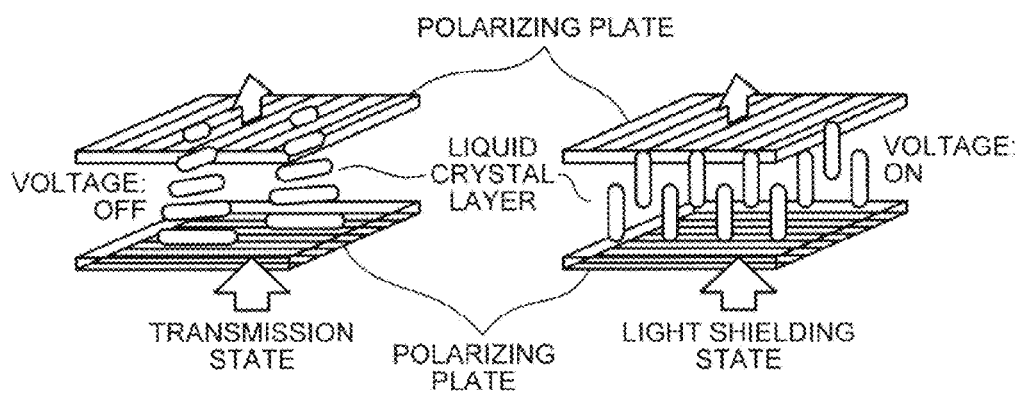

FIG. 2A and FIG. 2B are schematics for explaining an example of a stereoscopic display monitor that performs stereoscopic display using two-parallax images. In the example illustrated in FIGS. 2A and 2B, the stereoscopic display monitor performs a stereoscopic display by a shutter method, and shutter glasses are used as stereoscopic glasses worn by an observer who observes the monitor. The stereoscopic display monitor alternately outputs a two-parallax image in the monitor. For example, the monitor illustrated in FIG. 2A alternately outputs a left-eye image and a right-eye image with 120 Hz. As illustrated in FIG. 2A, the monitor includes an infrared-ray output unit, and controls an output of an infrared ray according to a timing at which images are switched.

The infrared ray output from the infrared-ray output unit is received by an infrared-ray receiving unit of the shutter glasses illustrated in FIG. 2A. A shutter is mounted to each of right and left frames of the shutter glasses, and the shutter glasses alternately switch a transmission state and a light shielding state of the right and left shutters according to a timing at which the infrared-ray receiving unit receives the infrared ray. A switching process of a transmission state and a light shielding state of the shutter will be described below.

As illustrated in FIG. 2B, each shutter includes an incident side polarizing plate and an output side polarizing plate, and further includes a liquid crystal layer disposed between the incident side polarizing plate and the output side polarizing plate. The incident side polarizing plate and the output side polarizing plate are orthogonal to each other as illustrated in FIG. 2B. Here, as illustrated in FIG. 2B, in an OFF state in which a voltage is not applied, light has passed through the incident side polarizing plate rotates at 90° due to an operation of the liquid crystal layer, and passes through the output side polarizing plate. In other words, the shutter to which a voltage is not applied becomes a transmission state.

Meanwhile, as illustrated in FIG. 2B, in an ON state in which a voltage is applied, a polarization rotation operation caused by liquid crystal molecules of the liquid crystal layer does not work, and thus light having passed through the incident side polarizing plate is shielded by the output side polarizing plate. In other words, the shutter to which a voltage is applied becomes a light shielding state.

In this regard, for example, the infrared-ray output unit outputs the infrared ray during a time period in which the left-eye image is being displayed on the monitor. Then, during a time period in which the infrared ray is being received, the infrared-ray receiving unit applies a voltage to the right-eye shutter without applying a voltage to the left-eye shutter. Through this operation, as illustrated in FIG. 2A, the right-eye shutter becomes the light shielding state, and the left-eye shutter becomes the transmission state, so that the left-eye image is incident to the left eye of the observer. Meanwhile, during a time period in which the right-eye image is being displayed on the monitor, the infrared-ray output unit stops an output of the infrared ray. Then, during a time period in which the infrared ray is not being received, the infrared-ray receiving unit applies a voltage to the left-eye shutter without applying a voltage to the right-eye shutter. Through this operation, the left-eye shutter becomes the light shielding state, and the right-eye shutter becomes the transmission state, so that the right-eye image is incident to the right eye of the observer. As described above, the stereoscopic display monitor illustrated in FIGS. 2A and 2B causes an image stereoscopically viewable to the observer to be displayed by switching an image to be displayed on the monitor in conjunction with the state of the shutter. A monitor employing a polarizing glasses method other than the shutter method is also known as the stereoscopic display monitor that allows a two-parallax image to be stereoscopically viewed.

Further, a stereoscopic display monitor that allows an observer to stereoscopically view a multi-parallax image with the naked eyes such as a nine-parallax image using a light beam controller such as a lenticular lens has been recently put to practical. This kind of stereoscopic display monitor makes a stereoscopic view possible by binocular parallax, and further makes a stereoscopic view possible by kinematic parallax in which an observed video changes with the movement of a point of view of an observer.

Figure 3:
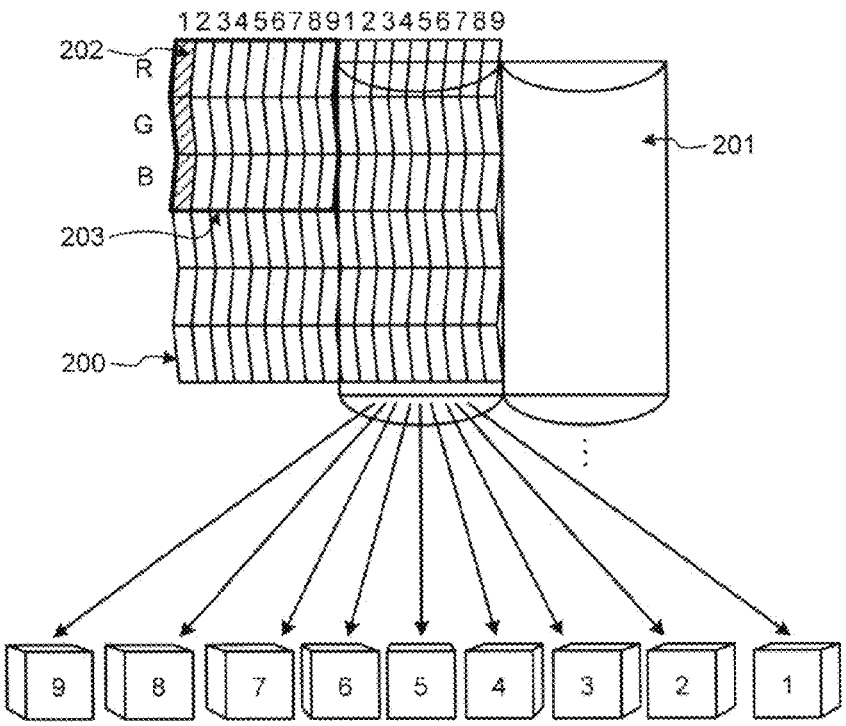
FIG. 3 is a diagram for describing an example of a stereoscopic display monitor that performs a stereoscopic display based on a nine-parallax image.

FIG. 3 is a schematic for explaining an example of a stereoscopic display monitor that performs stereoscopic display using nine-parallax images. In the stereoscopic display monitor illustrated in FIG. 3, a light beam controller is arranged in front of a planar display surface 200 such as a liquid crystal panel. For example, in the stereoscopic display monitor illustrated in FIG. 3, a vertical lenticular sheet 201 including an optical opening that extends in a vertical direction is attached to the front surface of the display surface 200 as the light beam controller.

As illustrated in FIG. 3, in the display surface 200, an aspect ratio is 3:1, and pixels 202 each of which includes three sub-pixels of red (R), green (G), and blue (B) arranged in a longitudinal direction are arranged in the form of a matrix. The stereoscopic display monitor illustrated in FIG. 3 converts a nine-parallax image including nine images into an interim image arranged in a predetermined format (for example, in a lattice form), and outputs the interim image to the display surface 200. In other words, the stereoscopic display monitor illustrated in FIG. 3 allocates nine pixels at the same position in the nine-parallax image to the pixels 202 of nine columns, respectively, and then performs an output. The pixels 202 of nine columns become a unit pixel group 203 to simultaneously display nine images having different point-of-view positions.

The nine-parallax image simultaneously output as the unit pixel group 203 in the display surface 200 is radiated as parallel light through a Light Emitting Diode (LED) backlight, and further radiated in multiple directions through the vertical lenticular sheet 201. As light of each pixel of the nine-parallax image is radiated in multiple directions, lights incident to the left eye and the right eye of the observer change in conjunction with the position (the position of the point of view) of the observer. In other words, depending on an angle at which the observer views, a parallax image incident to the right eye differs in a parallactic angle from a parallax image incident to the left eye. Through this operation, the observer can stereoscopically view a shooting target, for example, at each of nine positions illustrated in FIG. 3. For example, the observer can stereoscopically view, in a state in which the observer directly faces a shooting target, at the position of "5" illustrated in FIG. 3, and can stereoscopically view, in a state in which a direction of a shooting target is changed, at the positions other than "5" illustrated in FIG. 3. The stereoscopic display monitor illustrated in FIG. 3 is merely an example. The stereoscopic display monitor that displays the nine-parallax image may include a horizontal stripe liquid crystal of "RRR - - - , GGG - - - , and BBB - - - " as illustrated in FIG. 3 or may include a vertical stripe liquid crystal of "RGBRGB - - - ." Further, the stereoscopic display monitor illustrated in FIG. 3 may be of a vertical lens type in which a lenticular sheet is vertical as illustrated in FIG. 3 or may be of an oblique lens type in which a lenticular sheet is oblique.

The configuration example of the image processing system 1 according to the first embodiment has been briefly described so far. An application of the image processing system 1 described above is not limited to a case in which the PACS is introduced. For example, the image processing system 1 is similarly applied even to a case in which an electronic chart system for managing an electronic chart with a medical image attached thereto is introduced. In this case, the image storage device 120 serves as a database for managing an electronic chart. Further, for example, the image processing system 1 is similarly applied even to a case in which a Hospital Information System (HIS) or Radiology Information System (RIS) is introduced. Further, the image processing system 1 is not limited to the above-described configuration example. A function or an assignment of each device may be appropriately changed according to an operation form.

Figure 4:
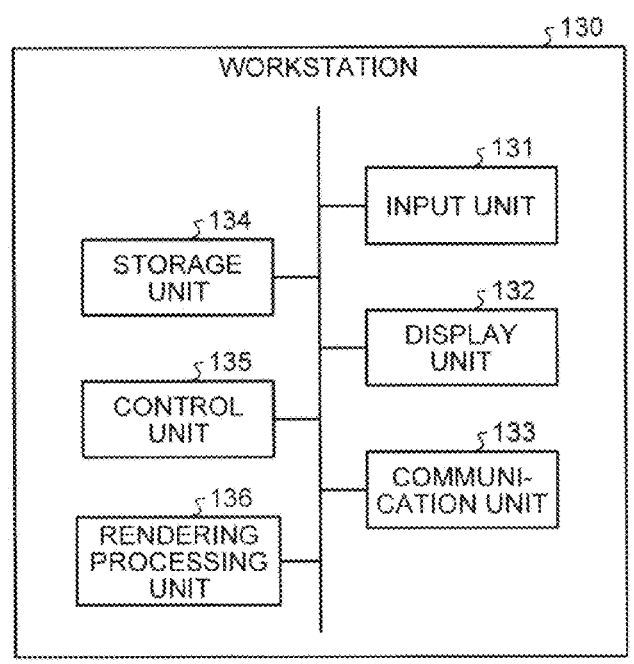
FIG. 4 is a diagram for describing a configuration example of a workstation according to the first embodiment.

Next, a configuration example of a workstation according to the first embodiment will be described with reference to FIG. 4. FIG. 4 is a diagram for explaining an exemplary configuration of a workstation according to the first embodiment. In the following, a "parallax image group" refers to an image group for a stereoscopic view generated by performing a volume rendering process on volume data. Further, a "parallax image" refers to each of images that configure the "parallax image group." In other words, the "parallax image group" is configured with a plurality of "parallax images" having different point-of-view positions.

The workstation 130 according to the first embodiment is a high-performance computer appropriate to image processing or the like, and includes an input unit 131, a display unit 132, a communication unit 133, a storage unit 134, a control unit 135, and a rendering processing unit 136 as illustrated in FIG. 4. In the following, a description will be made in connection with an example in which the workstation 130 is a high-performance computer appropriate to image processing or the like. However, the workstation 130 is not limited to this example, and may be an arbitrary information processing device. For example, the workstation 130 may be an arbitrary personal computer.

The input unit 131 includes a mouse, a keyboard, a trackball, or the like, and receives various operations which an operator has input on the workstation 130. Specifically, the input unit 131 according to the first embodiment receives an input of information used to acquire volume data which is a target of the rendering process from the image storage device 120. For example, the input unit 131 receives an input of the patient ID, the inspection ID, the apparatus ID, the series ID, or the like. Further, the input unit 131 according to the first embodiment receives an input of a condition (hereinafter, referred to as a "rendering condition") related to the rendering process.

The display unit 132 includes a liquid crystal panel serving as a stereoscopic display monitor, and displays a variety of information. Specifically, the display unit 132 according to the first embodiment displays a Graphical User Interface (GUI), which is used to receive various operations from the operator, a parallax image group, or the like. The communication unit 133 includes a Network Interface Card (NIC) or the like and performs communication with other devices.

The storage unit 134 includes a hard disk, a semiconductor memory device, or the like, and stores a variety of information. Specifically, the storage unit 134 according to the first embodiment stores the volume data acquired from the image storage device 120 through the communication unit 133. Further, the storage unit 134 according to the first embodiment stores volume data which is under the rendering process, a parallax image group generated by the rendering process, or the like.

The control unit 135 includes an electronic circuit such as a Central Processing Unit (CPU), a Micro Processing Unit (MPU), or a Graphics Processing Unit (GPU) or an integrated circuit such as an Application Specific Integrated Circuit (ASIC) or a Field Programmable Gate Array (FPGA). The control unit 135 controls the workstation 130 in general.

For example, the control unit 135 according to the first embodiment controls a display of the GUI on the display unit 132 or a display of a parallax image group. Further, for example, the control unit 135 controls transmission/reception of the volume data or the parallax image group to/from the image storage device 120, which is performed through the communication unit 133. Further, for example, the control unit 135 controls the rendering process performed by the rendering processing unit 136. Further, for example, the control unit 135 controls an operation of reading volume data from the storage unit 134 or an operation of storing a parallax image group in the storage unit 134.

In the first embodiment, the control unit 135 of the workstation 130 controls the rendering processing performed by the rendering processing unit 136, and cooperates with the rendering processing unit 136. Thus, the control unit 135 generates parallax images of different parallax positions alternately between continuous time-phase data and displays the parallax images on the display unit 132. This operation will be described later in detail.

The rendering processing unit 136 performs various rendering processes on volume data acquired from the image storage device 120 under control of the control unit 135, and thus generates a parallax image group. Specifically, the rendering processing unit 136 according to the first embodiment reads volume data from the storage unit 134, and first performs pre-processing on the volume data. Next, the rendering processing unit 136 performs a volume rendering process on the pre-processed volume data, and generates a parallax image group. Subsequently, the rendering processing unit 136 generates a 2D image in which a variety of information (a scale, a patient name, an inspection item, and the like) is represented, and generates a 2D output image by superimposing the 2D image on each parallax image group. Then, the rendering processing unit 136 stores the generated parallax image group or the 2D output image in the storage unit 134. Further, in the first embodiment, the rendering process refers to the entire image processing performed on the volume data, and the volume rendering process a process of generating a 2D image in which 3D information is reflected during the rendering process. For example, the medical image generated by the rendering process corresponds to a parallax image.

Figure 5:
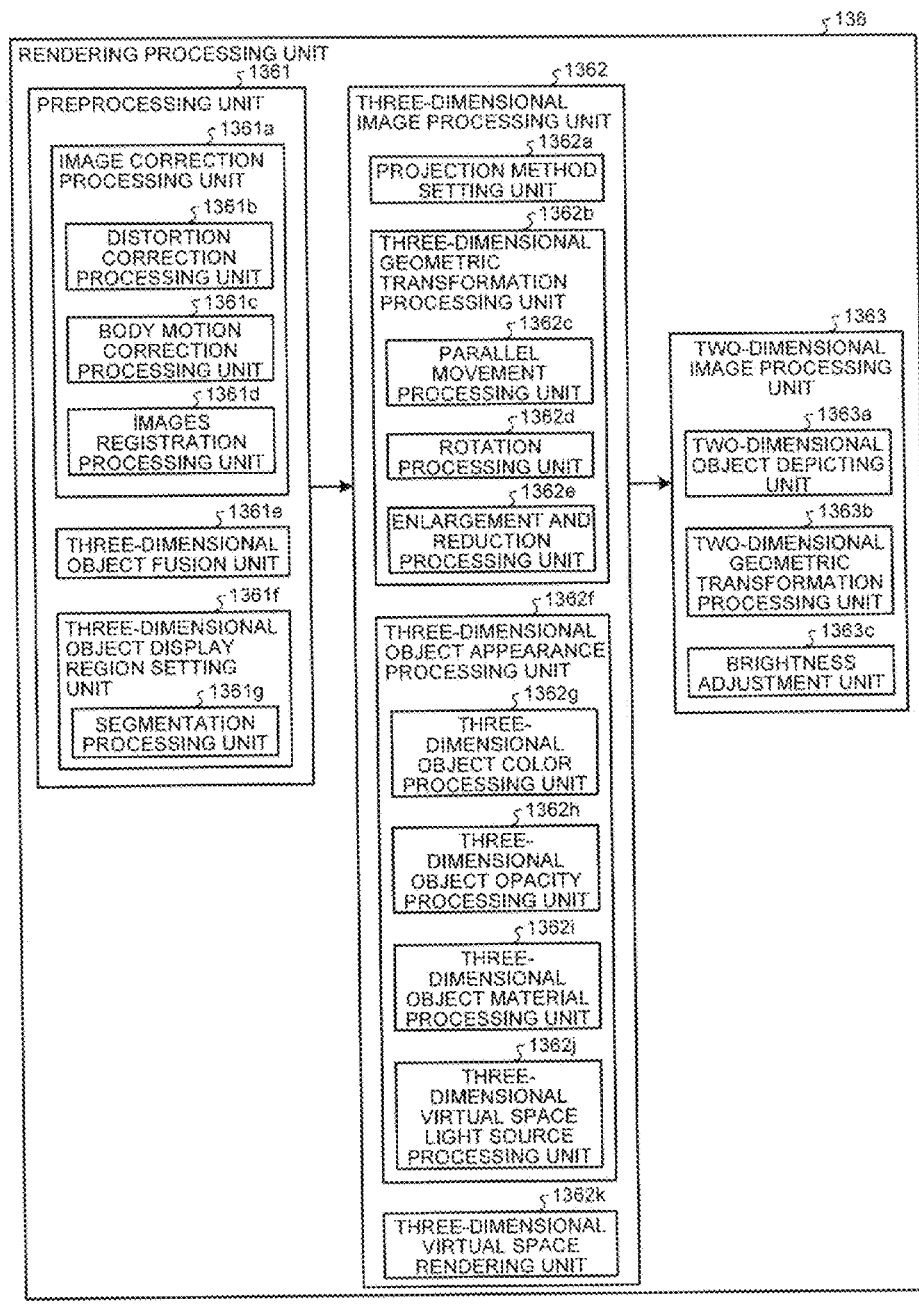
FIG. 5 is a diagram for describing a configuration example of a rendering processing unit illustrated in FIG. 4.

FIG. 5 is a diagram for explaining an exemplary configuration of a rendering processing unit illustrated in FIG. 4. As illustrated in FIG. 5, the rendering processing unit 136 includes a pre-processing unit 1361, a 3D image processing unit 1362, and a 2D image processing unit 1363. The pre-processing unit 1361 performs pre-processing on volume data. The 3D image processing unit 1362 generates a parallax image group from pre-processed volume data. The 2D image processing unit 1363 generates a 2D output image in which a variety of information is superimposed on a parallax image group. The respective units will be described below in order.

The pre-processing unit 1361 is a processing unit that performs a variety of pre-processing when performing the rendering process on volume data, and includes an image correction processing unit 1361a, a 3D object fusion unit 1361e, and a 3D object display area setting unit 1361f.

The image correction processing unit 1361a is a processing unit that performs an image correction process when processing two types of volume data as one volume data, and includes a distortion correction processing unit 1361b, a body motion correction processing unit 1361c, and an inter-image positioning processing unit 1361d as illustrated in FIG. 5. For example, the image correction processing unit 1361a performs an image correction process when processing volume data of a PET image generated by a PET-CT apparatus and volume data of an X-ray CT image as one volume data. Alternatively, the image correction processing unit 1361a performs an image correction process when processing volume data of a T1-weighted image and volume data of a T2-weighted image which are generated by an MRI apparatus as one volume data.

Further, the distortion correction processing unit 1361b corrects distortion of individual volume data caused by a collection condition at the time of data collection by the medical image diagnosis apparatus 110. Further, the body motion correction processing unit 1361c corrects movement caused by body motion of a subject during a data collection time period used to generate individual volume data. Further, the inter-image positioning processing unit 1361d performs positioning (registration), for example, using a cross correlation method between two pieces of volume data which have been subjected to the correction processes by the distortion correction processing unit 1361b and the body motion correction processing unit 1361c.

The 3D object fusion unit 1361e performs the fusion of a plurality of volume data which have been subjected to the positioning by the inter-image positioning processing unit 1361d. Further, the processes performed by the image correction processing unit 1361a and the 3D object fusion unit 1361e may not be performed when the rendering process is performed on single volume data.

The 3D object display area setting unit 1361f is a processing unit that sets a display area corresponding to a display target organ designated by an operator, and includes a segmentation processing unit 1361g. The segmentation processing unit 1361g is a processing unit that extracts an organ, such as a heart, a lung, or a blood vessel, which is designated by the operator, for example, by an area extension technique based on a pixel value (voxel value) of volume data.

Further, the segmentation processing unit 1361g does not perform the segmentation process when a display target organ has not been designated by the operator. Further, the segmentation processing unit 1361g extracts a plurality of corresponding organs when a plurality of display target organs is designated by the operator. Further, the process performed by the segmentation processing unit 1361g may be re-executed at a fine adjustment request of the operator who has referred to a rendering image.

The 3D image processing unit 1362 performs the volume rendering process on the pre-processed volume data which has been subjected to the process performed by the pre-processing unit 1361. As processing units for performing the volume rendering process, the 3D image processing unit 1362 includes a projection method setting unit 1362a, a 3D geometric transform processing unit 1362b, a 3D object appearance processing unit 1362f, and a 3D virtual space rendering unit 1362k.

The projection method setting unit 1362a determines a projection method for generating a parallax image group. For example, the projection method setting unit 1362a determines whether the volume rendering process is to be executed using a parallel projection method or a perspective projection method.

The 3D geometric transform processing unit 1362b is a processing unit that determines information necessary to perform 3D geometric transform on volume data which is to be subjected to the volume rendering process, and includes a parallel shift processing unit 1362c, a rotation processing unit 1362d, and a scaling processing unit 1362e. The parallel shift processing unit 1362c is a processing unit that determines a shift amount to shift volume data in parallel when a point-of-view position is shifted in parallel at the time of the volume rendering process. The rotation processing unit 1362d is a processing unit that determines a movement amount for rotationally moving volume data when a point-of-view position is rotationally moved at the time of the volume rendering process. Further, the scaling processing unit 1362e is a processing unit that determines an enlargement ratio or a reduction ratio of volume data when it is requested to enlarge or reduce a parallax image group.

The 3D object appearance processing unit 1362f includes a 3D object color processing unit 1362g, a 3D object opacity processing unit 1362h, a 3D object quality-of-material processing unit 1362i, and a 3D virtual space light source processing unit 1362j. The 3D object appearance processing unit 1362f performs a process of determining a display form of a parallax image group to be displayed through the above processing units, for example, according to the operator's request.

The 3D object color processing unit 1362g is a processing unit that determines a color colored to each area segmented from volume data. The 3D object opacity processing unit 1362h is a processing unit that determines opacity of each voxel configuring each area segmented from volume data. In volume data, an area behind an area having opacity of "100%" is not represented in a parallax image group. Further, in volume data, an area having opacity of "0%" is not represented in a parallax image group.

The 3D object quality-of-material processing unit 1362i is a processing unit that determines the quality of a material of each area segmented from volume data and adjusts the texture when the area is represented. The 3D virtual space light source processing unit 1362j is a processing unit that determines the position or the type of a virtual light source installed in a 3D virtual space when the volume rendering process is performed on volume data. Examples of the type of a virtual light source include a light source that emits a parallel beam from infinity and a light source that emits a radial beam from a point of view.

The 3D virtual space rendering unit 1362k performs the volume rendering process on volume data, and generates a parallax image group. Further, the 3D virtual space rendering unit 1362k uses a variety of information, which is determined by the projection method setting unit 1362a, the 3D geometric transform processing unit 1362b, and the 3D object appearance processing unit 1362f, as necessary when the volume rendering process is performed.

Here, the volume rendering process performed by the 3D virtual space rendering unit 1362k is performed according to the rendering condition. For example, the parallel projection method or the perspective projection method may be used as the rendering condition. Further, for example, a reference point-of-view position, a parallactic angle, and a parallax number may be used as the rendering condition. Further, for example, a parallel shift of a point-of-view position, a rotational movement of a point-of-view position, an enlargement of a parallax image group, and a reduction of a parallax image group may be used as the rendering condition. Further, for example, a color colored, transparency, the texture, the position of a virtual light source, and the type of virtual light source may be used as the rendering condition. The rendering condition may be input by the operator through the input unit 131 or may be initially set. In either case, the 3D virtual space rendering unit 1362k receives the rendering condition from the control unit 135, and performs the volume rendering process on volume data according to the rendering condition. Further, at this time, the projection method setting unit 1362a, the 3D geometric transform processing unit 1362b, and the 3D object appearance processing unit 1362f determine a variety of necessary information according to the rendering condition, and thus the 3D virtual space rendering unit 1362k generates a parallax image group using a variety of information determined.

Figure 6:
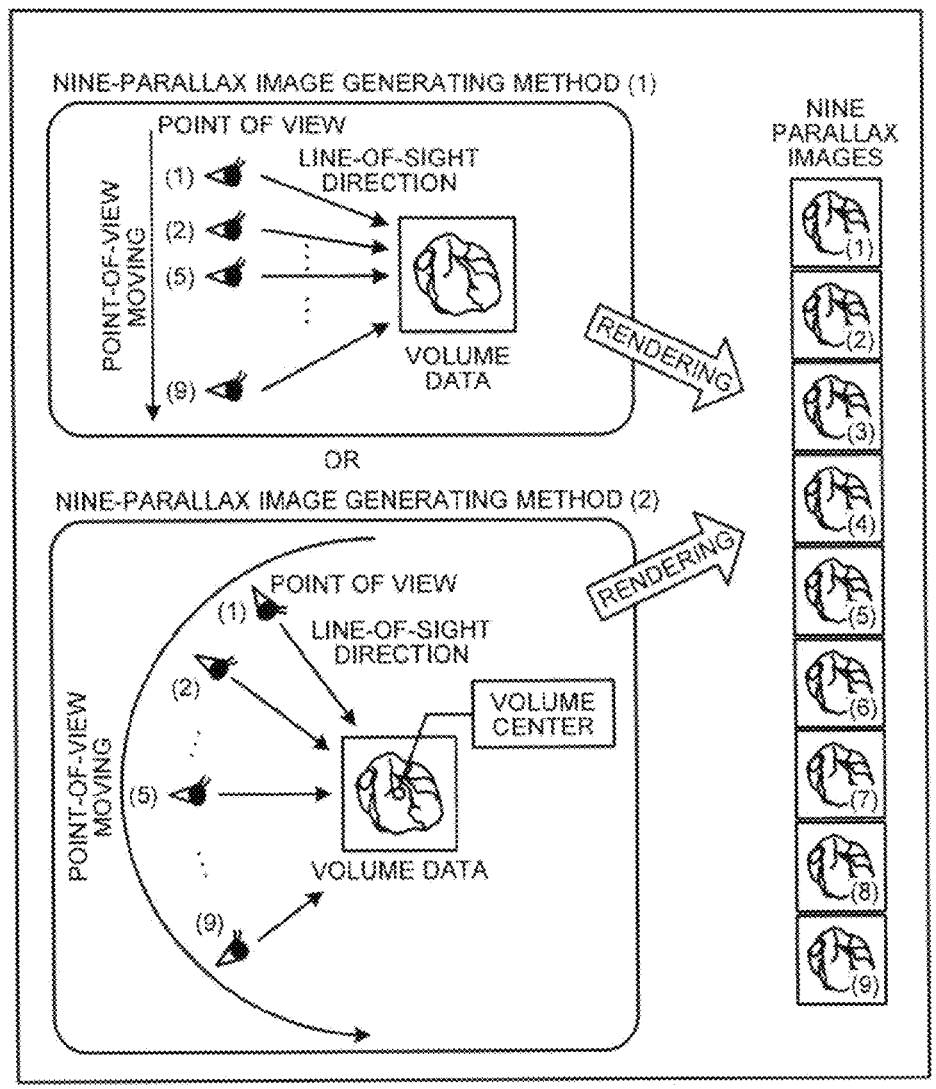
FIG. 6 is a diagram for describing an example of a volume rendering process according to the first embodiment.

FIG. 6 is a schematic for explaining an example of volume rendering processing according to the first embodiment. For example, let us assume that the 3D virtual space rendering unit 1362k receives the parallel projection method as the rendering condition, and further receives a reference point-of-view position (5) and a parallactic angle "1°" as illustrated in a "nine-parallax image generating method (1)" of FIG. 6. In this case, the 3D virtual space rendering unit 1362k shifts the position of a point of view to (1) to (9) in parallel so that the parallactic angle can be changed by "1°", and generates nine parallax images between which the parallactic angle (an angle in a line-of-sight direction) differs from each other by 1° by the parallel projection method. Further, when the parallel projection method is performed, the 3D virtual space rendering unit 1362k sets a light source that emits a parallel beam in a line-of-sight direction from infinity.

Alternatively, the 3D virtual space rendering unit 1362k receives the perspective projection method as the rendering condition, and further receives a reference point-of-view position (5) and a parallactic angle "1°" as illustrated in a "nine-parallax image generating method (2)" of FIG. 6. In this case, the 3D virtual space rendering unit 1362k rotationally moves the position of a point of view to (1) to (9) so that the parallactic angle can be changed by "1°" centering on the center (gravity center) of volume data, and generates nine parallax images between which the parallactic angle differs from each other by 1° by the perspective projection method. Further, when the perspective projection method is performed, the 3D virtual space rendering unit 1362k sets a point light source or a surface light source, which three-dimensionally emits light in a radial manner centering on a line-of-sight direction, at each point of view. Further, when the perspective projection method is performed, the points of view (1) to (9) may be parallel-shifted according to the rendering condition.

Further, the 3D virtual space rendering unit 1362k may perform the volume rendering process using the parallel projection method and the perspective projection method together by setting a light source that two-dimensionally emits light in a radial manner centering on the line-of-sight direction on a longitudinal direction of a volume rendering image to display, and emits a parallel beam in the line-of-sight direction from infinity on a transverse direction of a volume rendering image to display.

The nine parallax images generated in the above-described way configure a parallax image group. In the first embodiment, for example, the nine parallax images are converted into interim images arranged in a predetermined format (for example, a lattice form) by the control unit 135, and then output to the display unit 132 serving as the stereoscopic display monitor. At this time, the operator of the workstation 130 can perform an operation of generating a parallax image group while checking a stereoscopically viewable medical image displayed on the stereoscopic display monitor.

The example of FIG. 6 has been described in connection with the case in which the projection method, the reference point-of-view position, and the parallactic angle are received as the rendering condition. However, similarly even when any other condition is received as the rendering condition, the 3D virtual space rendering unit 1362k generates the parallax image group while reflecting each rendering condition.

Subsequently, the parallax image group which the 3D image processing unit 1362 has generated based on the volume data is regarded as an underlay. Then, an overlay in which a variety of information (a scale, a patient name, an inspection item, and the like) is represented is superimposed on the underlay, so that a 2D output image is generated. The 2D image processing unit 1363 is a processing unit that performs image processing on the overlay and the underlay and generates a 2D output image, and includes a 2D object rendering unit 1363*a*, a 2D geometric transform processing unit 1363*b*, and a brightness adjusting unit 1363*c* as illustrated in FIG. 5. For example, in order to reduce a load required in a process of generating a 2D output image, the 2D image processing unit 1363 generates nine 2D output images by superimposing one overlay on each of nine parallax images (underlays). In the following, an underlay on which an overlay is superimposed may be referred to simply as a "parallax image."

The 2D object rendering unit 1363*a* is a processing unit that renders a variety of information represented on the overlay. The 2D geometric transform processing unit 1363*b* is a processing unit that parallel-shifts or rotationally moves the position of a variety of information represented on the overlay, or enlarges or reduces a variety of information represented on the overlay.

The brightness adjusting unit 1363*c* is a processing unit that performs a brightness converting process. For example, the brightness adjusting unit 1363*c* adjusts brightness of the overlay and the underlay according to an image processing parameter such as gradation of a stereoscopic display monitor of an output destination, a window width (WW), or a window level (WL).

The two-dimensional images to be output that are generated in this manner are temporarily stored in the storage unit 134 by the control unit 135, for example, and are transmitted to the image storage device 120 via the communication unit 133. If the terminal device 140 acquires the two-dimensional images to be output from the image storage device 120, converts the two-dimensional images into an intermediate image in which the two-dimensional images are arranged in a predetermined format (for example, a lattice form), and displays the intermediate image on the stereoscopic display monitor, for example, the doctor or the laboratory technician who is the observer can browse the medical image capable of being viewed stereoscopically with the various types of information (e.g., a scale, a patient's name, and an examination item) depicted thereon.

The configuration of the workstation 130 according to the present embodiment has been described so far. Through this configuration, the workstation 130 according to the present embodiment can improve a degree of the depth of a stereoscopically viewable image according to control of the control unit 135, which will be described in detail below. In the following, a stereoscopically viewable image is sometimes referred to as a stereoscopic image.

Figure 7:
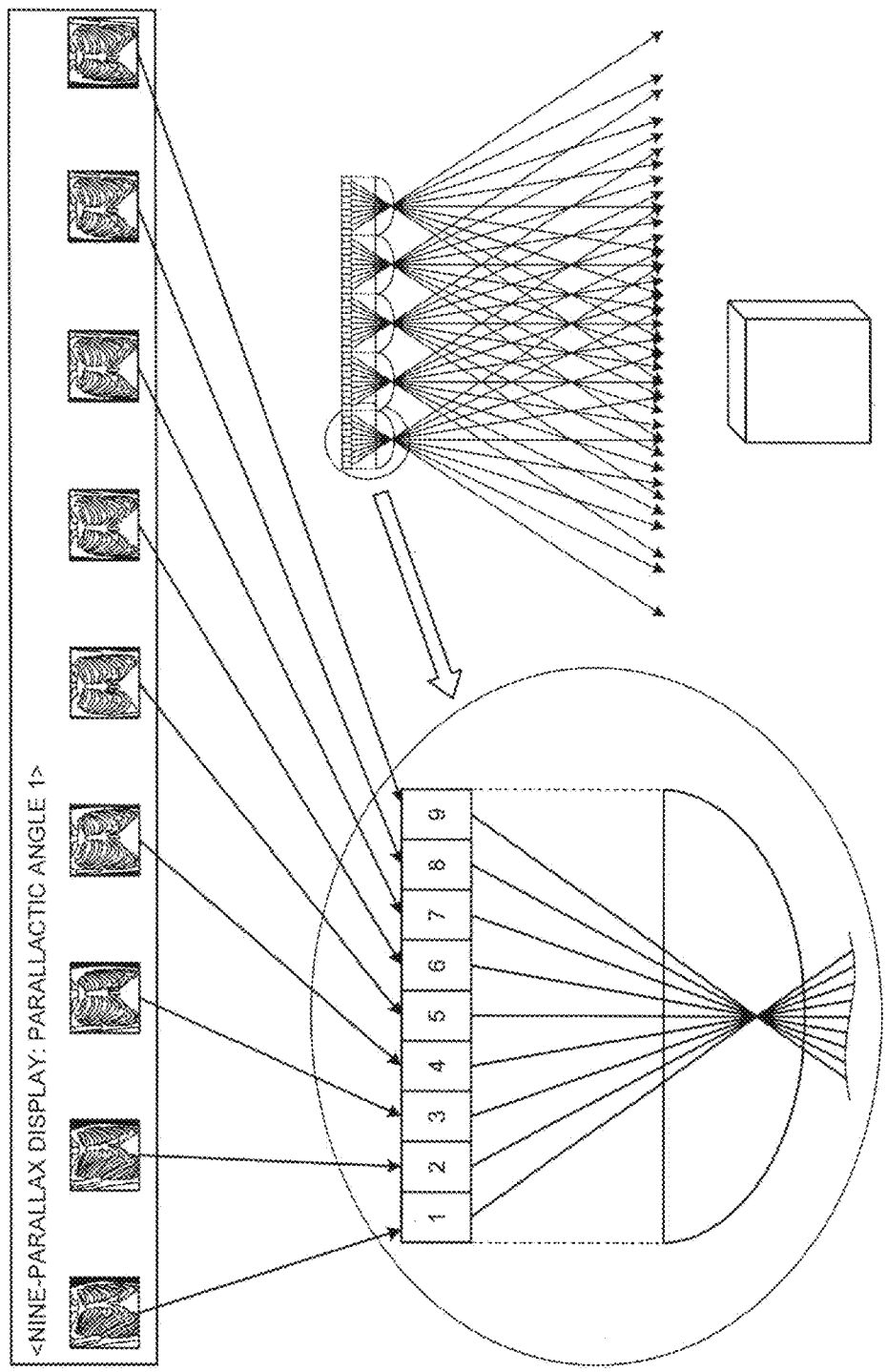
FIG. 7 is a first diagram for describing a problem of the related art.

Here, first, a degree of the depth of the stereoscopic image in the related art will be described. FIG. 7 is a first diagram for describing a problem of the related art. FIG. 7 illustrates an example in which a unit pixel group is configured with pixels 1 to 9, and a stereoscopic image is displayed such that nine parallax images generated with a parallactic angle "1°" are output with corresponding pixel values from the respective pixels. As illustrated in FIG. 7, when a stereoscopic image is displayed by nine parallax images generated with a parallactic angle "1°," since parallax is small, information of the depth included in the nine parallax images is small, and thus a degree of the depth of the stereoscopic image to be displayed is lowered.

Figure 8:
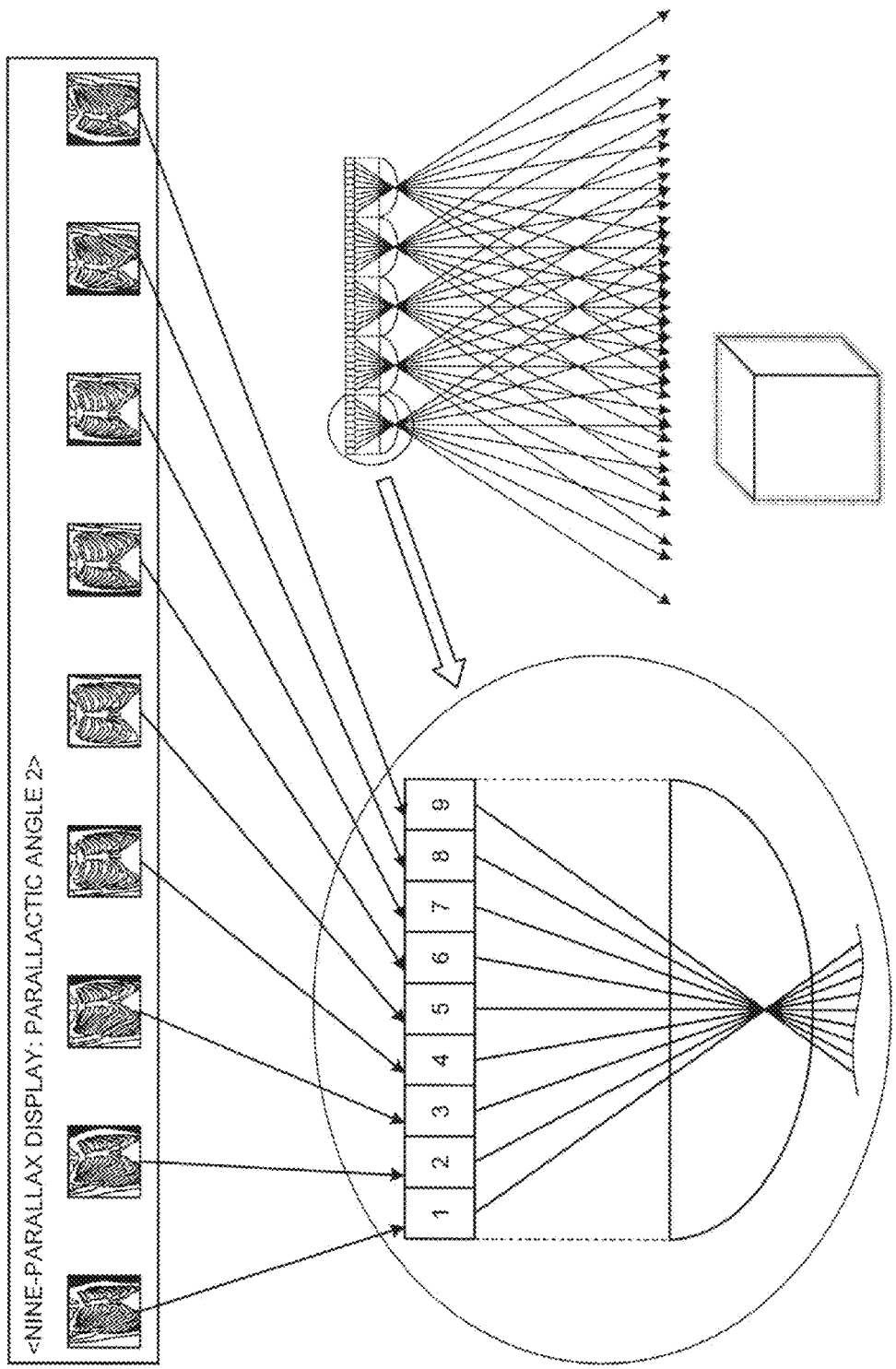
FIG. 8 is a second diagram for describing a problem of the related art.

In this regard, when the parallactic angle increases, the information of the depth included in the nine parallax images increases, and a degree of the depth increases, but there is a problem in that an image is blurred. FIG. 8 is a second diagram for describing a problem of the related art. FIG. 8 illustrates an example in which a unit pixel group is configured with pixels 1 to 9, and a stereoscopic image is displayed such that nine parallax images generated with a parallactic angle "2°" are output with corresponding pixel values from the respective pixels. As illustrated in FIG. 8, when a stereoscopic image is displayed by nine parallax images generated with a parallactic angle "2°," since an angle difference between parallax images output from neighboring pixels is large, a displayed stereoscopic image is blurred.

Figure 9:
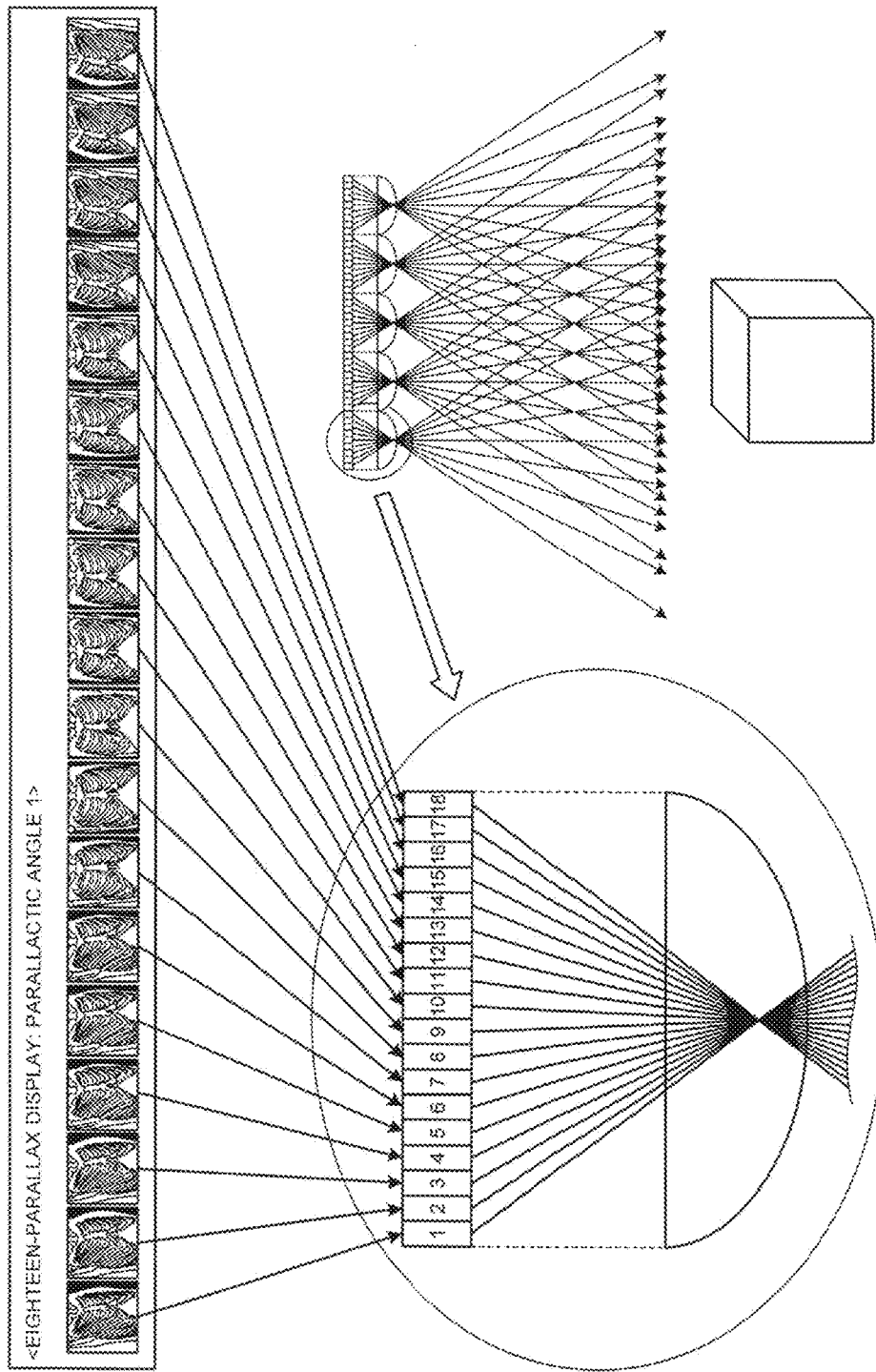
FIG. 9 is a diagram for describing an example of a technique of improving a degree of the depth of a stereoscopic image having no blur.

In other words, in the related art, there is a certain limit to a degree of the depth of a stereoscopic image having no blur. For example, a technique of increasing the resolution is considered as a solution to this problem. FIG. 9 is a diagram for describing an example of a technique of improving a degree of the depth of a stereoscopic image having no blur. As illustrated in FIG. 9, for example, as a technique of increasing the resolution, a unit pixel group includes pixels 1 to 18. In this case, when eighteen parallax images generated with a parallactic angle "1°" are output with corresponding pixel values from the respective pixels, a stereoscopic image that has an improved degree of the depth and has no blur can be displayed.

Figure 10:
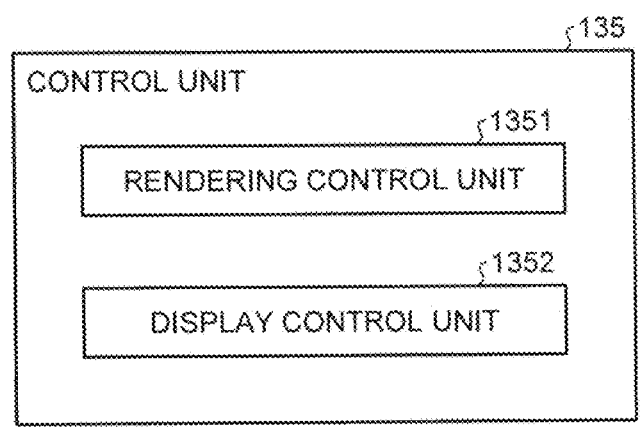
FIG. 10 is a diagram for describing a configuration example of a control unit according to the first embodiment.

However, an increase in the resolution by the hardware method illustrated in FIG. 9 causes a technical problem and is not easy to implement. In this regard, in this disclosure, a degree of the depth of a stereoscopic image having no blur can be improved by control of the control unit 135 illustrated in FIG. 4 without increasing the resolution by the hardware method. In this regard, the control unit 135 according to the first embodiment will be described below in detail. FIG. 10 is a diagram for describing a configuration example of the control unit 135 according to the first embodiment. As illustrated in FIG. 10, the control unit 135 includes a rendering control unit 1351 and a display control unit 1352.

The rendering control unit 1351 performs control such that parallax images of point-of-view positions which are larger in number than the number of pixels included in a unit pixel group to simultaneously display a plurality of parallax images are generated as a parallax image group displayed by the unit pixel group. Specifically, the rendering control unit 1351 controls the rendering processing unit 136 such that the volume rendering process is executed at point-of-view positions which are equal in number to an integral multiple of a parallax number displayable by the display unit 132.

FIG. 11 is a diagram for describing an example of a process performed by the rendering control unit 1351 according to the first embodiment. For example, when the display unit 132 can display a parallax image group having nine parallaxes, the rendering control unit 1351 controls the rendering processing unit 136 such that eighteen parallax images having a parallactic angle difference of "1°" therebetween are generated by rotate the point-of-view position from the reference point-of-view position to (1) through (18) at parallactic angle intervals of "1°" centering on the center (gravity center) of volume data as illustrated in FIG. 11. FIG. 11 has been described in connection with the example in which a parallax image is generated using a perspective projection method. However, an embodiment is not limited to this example, and, for example, a parallax image may be generated using a parallel projection method.

Referring back to FIG. 10, the display control unit 1352 performs control such that a plurality of parallax images whose point-of-view positions are adjacent to each other in the parallax image group generated by control of the rendering control unit 1351 are displayed by the same pixels while switching the plurality of parallax images at an arbitrary switching speed. Specifically, the display control unit 1352 switches a plurality of parallax images whose point-of-view positions are adjacent to each other so that a single parallax image is displayed, for example, 60 times for one second. An example of a process performed by the display control unit 1352 will be described below with reference to FIGS. 12A and 12B.

FIG. 12A is a diagram for describing an example of a first display process performed by the display control unit 1352 according to the first embodiment. FIG. 12A illustrates a process in which eighteen parallax images illustrated in FIG. 11 are generated by control of the rendering control unit 1351, and then the images are displayed the nine-parallax display unit 132. Here, "T1" illustrated in FIG. 12A represents a time phase of a display start.

For example, the display control unit 1352 first performs control such that among parallax images generated at point-of-view positions (1) to (18), parallax images of positions (1), (3), (5), (7), (9), (11), (13), (15), and (17) are displayed through pixels 1, 2, 3, 4, 5, 6, 7, 8 and 9, respectively, as illustrated in the time phase "T1" of FIG. 12A. In other words, the display control unit 1352 performs control such that pixel values corresponding to the parallax images of the positions (1), (3), (5), (7), (9), (11), (13), (15), and (17) are output from the pixels 1, 2, 3, 4, 5, 6, 7, 8, and 9, respectively.

Then, the display control unit 1352 switches the parallax images to be displayed through the pixels 1, 2, 3, 4, 5, 6, 7, 8, and 9 at an arbitrary switching speed. FIG. 12B is a diagram for describing an example of a second display process performed by the display control unit 1352 according to the first embodiment. FIG. 12B illustrates a process after the display process illustrated in FIG. 12A is performed. Here, "T2" illustrated in FIG. 12B represents a time phase next to "T1" when switching is performed at an arbitrary switching speed.

For example, the display control unit 1352 switches the parallax images to be displayed through the pixels 1, 2, 3, 4, 5, 6, 7, 8, and 9 to parallax images of the positions (2), (4), (6), (8), (10), (12), (14), (16), and (18) at an arbitrary switching speed, respectively, as illustrated in the time phase "T2" of FIG. 12B. Then, the display control unit 1352 displays the parallax image groups represented by the time phases "T1" and "T2" of FIG. 12B through the pixels 1, 2, 3, 4, 5, 6, 7, 8, and 9 while alternately switching the parallax image groups at an arbitrary switching speed.

Here, the display control unit 1352 switches the parallax image groups displayed, for example, at the speed of once per $1/120$ seconds as the arbitrary switching speed. In other words, the display control unit 1352 causes the display unit 132 to display the parallax image groups at the frequency of 120 Hz. This corresponds to a state in which among the eighteen parallax images, the nine parallax images represented by each of the time phases "T1" and "T2" are being displayed at 60 Hz, and means that an image is displayed in the same state as the current state in which the parallax image group is being displayed at the frequency of 60 Hz at normal times (when switching is not performed).

As described above, the workstation 130 according to the first embodiment divides the parallax image group generated at the point-of-view positions which are larger in number than a parallax number supported by the display unit 132 into groups of parallax number units, and displays each of the groups while switching each of the groups at an arbitrary switching speed. Thus, a stereoscopic image including more information about the depth direction than in the related art can be displayed, and a degree of the depth of a stereoscopic image having no blur can be improved without increasing the resolution by the hardware method.

Further, as described above, in the present disclosure, a degree of the depth can be improved by a software method, and thus an implementation thereof can be easily made. Further, for example, a depth increasing mode to increase a degree of the depth may be set. In this case, when the observer observes a medical image, the observer can cause the above-described process to be executed by turning the depth increasing mode on.

Next, a process of the workstation 130 according to the first embodiment will be described with reference to FIG. 13. FIG. 13 is a flow chart illustrating a procedure of a process performed by the workstation 130 according to the first embodiment. As illustrated in FIG. 13, in the workstation 130 according to the first embodiment, when the depth increasing mode is turned on (Yes in step S101), the rendering control unit 1351 controls the rendering processing unit 136 such that parallax images are generated at point-of-view positions which are equal in number to an n multiple of the number of pixels (step S102).

Then, the display control unit 1352 causes the n parallax images which are adjacent to one another to be displayed through the same pixels while alternately switching the n parallax images at an arbitrary switching speed (step S103). Thereafter, when the depth increasing mode is turned off or when an end command is received, the display control unit 1352 ends the process. Meanwhile, the rendering control unit 1351 is on standby until the depth increasing mode is turned on (No in step S101).

As described above, according to the first embodiment, the display unit 132 displays a predetermined number of parallax images. The rendering control unit 1351 performs control such that a group of parallax images of point-of-view positions which are larger in number than the predetermined number are generated. The display control unit 1352 classifies a group of parallax images generated by control of the rendering control unit 1351 into a first parallax image sub group including a set of parallax images whose point-of-view positions are discontinuous to each other and a second parallax image sub group including parallax images whose respective point-of-view positions are between the respective parallax images of the set, and performs controls such that the display unit 132 displays the first parallax image sub group and the second parallax image sub group while switching the first parallax image sub group and the second parallax image sub group at a predetermined switching speed. Thus, the workstation 130 according to the first embodiment can display a stereoscopic image including more information about the depth direction than in the related art, and can improve a degree of the depth of a stereoscopic image having no blur without increasing the resolution by the hardware method.

Further, according to the first embodiment, the display control unit 1352 switches a plurality of parallax images whose point-of-view positions are adjacent to each other such that a single parallax image is displayed 60 times for one second. Thus, the workstation 130 according to the first embodiment can display an image in the same display state as the normal display.

Second Embodiment

The first embodiment has been described in connection with the example of displaying parallax images having different point-of-view positions through the same pixel while switching the parallax images. A second embodiment will be described in connection with an example in which deviation between the parallax images displayed through the same pixel is corrected and then displayed. Further, in the second embodiment, the same configuration as the control unit 135 of FIG. 10 according to the first embodiment is provided. In the second embodiment, a control unit that corrects deviation between parallax images displayed through the same pixel is referred to as a display control unit 1352*a*. In other words, the display control unit 1352*a* has a configuration in which a new process is added to the display control unit 1352 illustrated in FIG. 10.

Here, first, an outline of a correction process executed by the display control unit 1352*a* will be described with reference to FIG. 14. FIG. 14 is a schematic view for describing an outline of a process executed by the display control unit 1352*a* according to the second embodiment. FIG. 14 illustrates pixels to output when eighteen parallax images illustrated in FIG. 11 are displayed by performing switching in units of nine parallax images.

For example, in the time phase "T1", the display control unit 1352 according to the first embodiment causes parallax images of positions (1), (3), (5), (7), (9), (11), (13), (15), and (17) to be displayed through pixels 1, 2, 3, 4, 5, 6, 7, 8, and 9, respectively, as illustrated in FIG. 14(A). Further, in the time phase "T2", the display control unit 1352 according to the first embodiment causes parallax images of positions (2), (4), (6), (8), (10), (12), (14), (16), and (18) to be displayed through the pixels 1, 2, 3, 4, 5, 6, 7, 8, and 9, respectively, as illustrated in FIG. 14(A).

Here, in case of the pixel 1, the parallax image of the position (1) is displayed in the time phase "T1", and the parallax image of the position (2) is displayed in the time phase "T2." In other words, deviation corresponding to a parallactic angle "1°" occurs between the parallax images displayed through the same pixel. Here, when the observer actually observes a medical image, it is not easy for the observer to observe without any movement, and slightly deviated parallax enters the eyes due to high-speed switching. Thus, a state close to a state in which eighteen parallaxes are input by a hardware method is created.

Further, the display control unit 1352*a* according to the second embodiment can perform control such that each of the parallax images to be displayed is displayed to straddle between neighboring pixels as illustrated in the time phase "T2" in FIG. 14(B). For example, as illustrated in FIG. 14(B), the display control unit 1352*a* can perform control such that the parallax image of the point-of-view position (2) is displayed through the pixels 1 and 2.

Specifically, the display control unit 1352*a* calculates a value of half a pixel value which is supposed to be output from each pixel for each pixel. Then, in order to cause each parallax image to be displayed to straddle between neighboring pixels, the display control unit 1352*a* accumulates the calculated value of half the pixel value for each pixel, and then performs controls such that an accumulated cumulative value is output from each pixel as a new pixel value.

FIG. 15 is a diagram for describing an example of a process performed by the display control unit 1352*a* according to the second embodiment. FIG. 15 illustrates a processing example of the display control unit 1352*a* on one unit pixel group when the eighteen parallax images illustrated in FIG. 11 are displayed through the display unit 132. Even though not illustrated, the display control unit 1352*a* performs the following process on all of unit pixel groups supported by the display unit 132.

For example, the display control unit 1352*a* first extracts pixel values corresponding to the parallax images to be displayed through a certain unit pixel group as illustrated in FIG. 15(A). Then, the display control unit 1352*a* determines pixel values to be output from the respective pixels in the time phase "T1" and the time phase "T2" as illustrated in FIG. 15(B).

Here, the display control unit 1352*a* calculates a value of half the pixel value for parallax image group of the time phase in which deviation is to be corrected, and calculates a cumulative value to which the calculated value is added for each pixel. For example, the display control unit 1352*a* sets the time phase "T2" as a correction target, and calculates a value of half the pixel value, that is, calculates 15 (=30/2) for the position (2), 25 (=50/2) for the position (4), 15 (=30/2) for the position (6), and the like as illustrated in FIG. 15(C).

Then, the display control unit 1352*a* sets the calculated value which is half the pixel value as an addition value on the neighboring pixel. For example, the display control unit 1352*a* sets the value "15" calculated based on the pixel value "30" for the position (2) as the addition value for the pixel value "50" of the position (4) as illustrated in FIG. 15(C). Here, the additional value is set only to a pixel that straddles between pixels. For example, in the pixels 1 and 2 illustrated in FIG. 14(B), half the parallax image of the position (2) to be output from the pixel 1 is output from the pixel 2. Thus, the pixel value "30" of the position (2) to be output through the pixel 1 is converted into "15" which is a half (½) thereof as illustrated in FIG. 15(C). Meanwhile, in the pixel 2, the pixel value "50" of the position (4) is converted into "25" which is a half (½) thereof, but since "15" which is half the pixel value "30" of the position (2), "15" is set as the additional value. Further, in the pixel 1, "0" is set as the additional value since the pixel value corresponding to another parallax image is not output.

Then, the display control unit 1352*a* calculates the cumulative value for each pixel by adding the additional value to the calculated value which is half the pixel value. For example, the display control unit 1352*a* calculates "40 (=25+ 15)" as the cumulative value of the pixel 2 as illustrated in FIG. 15(C). Then, the display control unit 1352*a* determines the calculated cumulative values as pixel values to be output through the respective pixel in the time phase of the correction target. For example, the display control unit 1352*a* determines 15 for the pixel 1, 40 for the pixel 2, 40 for the pixel 3, and the like as the pixel values to be output through the respective pixels in the time phase "T2" as illustrated in FIG. 15(D).

Thereafter, the display control unit 1352*a* performs control such that the pixel values which are not the correction target and the determined pixel values are output from the respective pixels while being alternately switched at an arbitrary switching speed (for example, once per ¹⁄₁₂₀ seconds).

The second embodiment has been described in connection with the example in which the time phase "T2" is the correction target. However, an embodiment is not limited to this example, and for example, the time phase "T1" may be the correction target. In this case, the display control unit 1352*a* corrects the pixel values such that the parallax image group of the time phase "T1" illustrated in FIG. 14(A) is wholly slid to the left.

Figure 16:
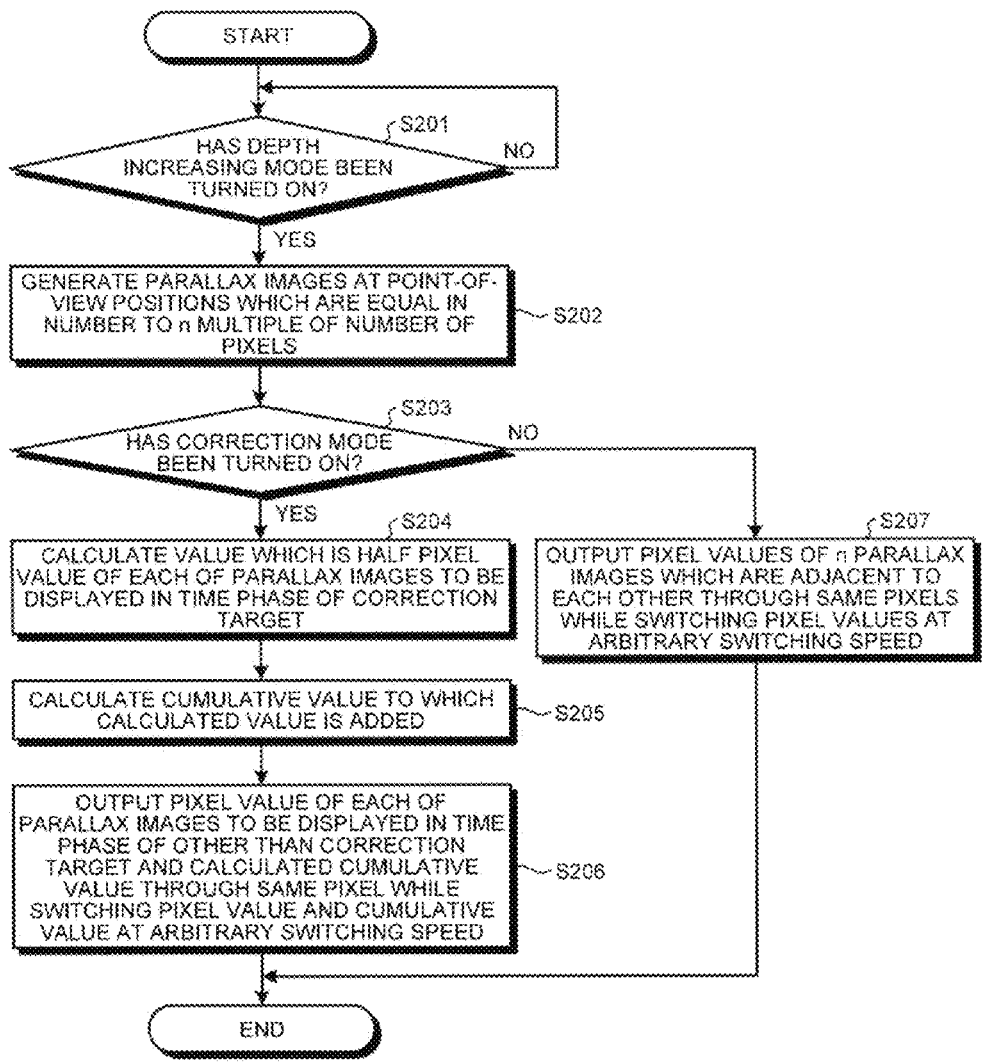
FIG. 16 is a flow chart illustrating a procedure of a process performed by a workstation according to the second embodiment.

Next, a process of the workstation 130 according to the second embodiment will be described with reference to FIG. 16. FIG. 16 is a flow chart illustrating a procedure of a process performed by the workstation 130 according to the second embodiment. As illustrated in FIG. 16, in the workstation 130 according to the second embodiment, when the depth increasing mode is turned on (Yes in step S201), the rendering control unit 1351 controls the rendering processing unit 136 such that parallax images are generated at point-of-view positions which are equal in number to an n multiple of the number of pixels (step S202).

Then, the display control unit 1352a determines whether or not the correction mode has been turned on (step S203). Here, when it is determined that the correction mode has been turned on (Yes in step S203), the display control unit 1352a calculates a value which is half a pixel value of each of the parallax images to be displayed in the time phase of the correction target (step S204).

Thereafter, the display control unit 1352a calculates a cumulative value to which the calculated value is added (step S205), and outputs the pixel value of each of the parallax images to be displayed in the time phase of the correction target and the calculated cumulative value through the same pixel while alternately switching the pixel value and the cumulative value at an arbitrary switching speed (step S206).

However, when it is determined in step S203 that the correction mode has not been turned on (No in step S203), the display control unit 1352a outputs the pixel values of the n parallax images which are adjacent to each other through the same pixels while alternately switching the pixel values of the n neighboring parallax images at an arbitrary switching speed (step S207). Thereafter, when the depth increasing mode is turned off or when the end command is received, the display control unit 1352a ends the process. Further, the rendering control unit 1351 is on standby until the depth increasing mode is turned on (No in step S201).

As described above, according to the second embodiment, the display control unit 1352a performs control such that among a plurality of parallax images to be displayed through the same pixels, at least one parallax image is displayed to straddle between the neighboring pixels. Thus, the workstation 130 according to the second embodiment can correct deviation between the point-of-view positions of the parallax images to be displayed through the same pixel, improve a degree of the depth, and display a high-resolution stereoscopic image.

Third Embodiment

The first and second embodiments have been described so far, but besides the first and second embodiments, various different embodiments may be made.

The second embodiment has been described in connection with the example in which deviation of the parallax image is corrected using the pixel value. However, deviation of the parallax image can be corrected such that a lenticular lens is slid in synchronization with a switching timing of the parallax image. FIG. 17 is a diagram for describing deviation correction by sliding a lenticular lens according to a third embodiment. FIG. 17 illustrates an example in which a lenticular lens is slid when the parallax images illustrated in FIG. 12B are switched.

When deviation is corrected by sliding a lenticular lens, for example, the display unit 132 includes a driving device that slides a lenticular lens. For example, the display unit 132 includes a vibration generating device or the like as the driving device. The control unit 135 synchronizes a switching frequency of the parallax image with a vibration frequency of the vibration generating device based on a reference signal such as a clock.

In this way, the lenticular lens is slid in synchronization with switching from the parallax images of the time phase "T1" illustrated in FIG. 17(A) to the parallax images of the time phase "T2" illustrated in FIG. 17(B), for example, as illustrated in FIG. 17. For example, when the lenticular lens is slid as indicated by an arrow 20 of FIG. 17(B), an advancing direction of light that has passed through the lenticular lens changes. Through this operation, deviation between the point-of-view positions of the parallax images can be corrected.

Further, the vibration frequency of the vibration generating device may be synchronized with the switching frequency of the parallax image by manually changing the vibration frequency of the vibration generating device. For example, the display unit 132 may be provided with a dial used to change the vibration frequency of the vibration generating device. The observer can correct deviation between the point-of-view positions of the parallax images by operating the dial while observing the stereoscopic image.

Further, the above-described embodiments have been described in connection with the example in which the eighteen parallax images are generated from the volume data, and the generated eighteen parallax images are displayed such that switching is performed units of nine parallax images. However, an embodiment is not limited to this example, and an arbitrary number of parallax images may be used to the extent that the number of parallax image is an integral multiple of a parallax number. For example, 36 parallax images may be generated from volume data, and the generated 36 parallax images may be displayed such that switching is performed units of nine parallax images. In this case, the display unit 132 is set to perform a display at 240 Hz.

Further, the above-described embodiments have been described in connection with the example in which the workstation 130 executes the rendering process on the volume data, and displays the generated parallax image. However, the disclosed technology is not limited to this example. For example, the medical image diagnosis apparatus 110 executes the rendering process on the volume data, and displays the generated parallax image. Further, either the medical image diagnosis apparatus 110 or the workstation 130 may execute the rendering process on the volume data, and the terminal device 140 may display the image.

Further, the above-described embodiments have been described in connection with the example in which the terminal device 140 displays the medical image acquired from the image storage device 120. However, the disclosed technology is not limited to this example. For example, the terminal device 140 may be connected directly to the medical image diagnosis apparatus 110 or the workstation 130.

Further, the above-described embodiments have been described in connection with the example in which the workstation 130 acquires the volume data from the image storage device 120, and executes the rendering process on the volume data. However, the disclosed technology is not limited to this example. For example, the workstation 130 may acquire the volume data from the medical image diagnosis apparatus 110, and execute the rendering process on the volume data.

As described above, according to the embodiments, the image processing system, apparatus and method and the medical image diagnosis apparatus of the present embodiment can improve a degree of the depth of the stereoscopically viewable image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing system, comprising:
a display configured to display a stereoscopic image by arranging parallax images generated by performing a volume rendering process on volume data while sequentially changing a point-of-view position by a predetermined parallactic angle with a same number of pixels as a number of point-of-view positions, and outputting the arranged parallax images; and
a processing circuit configured to
generate different parallax images which are an integer multiple of the number of pixels by performing the volume rendering process on the volume data at point-of-view positions which are the integer multiple of the number of pixels when receiving an operation to change to a predetermined mode,
classify the generated different parallax images that are the integer multiple of the number of pixels into a first parallax image sub group to be a set of parallax images whose point-of-view positions are discontinuous to each other and a same in number as the number of pixels and a second parallax image sub group including a set of parallax images whose point-of-view positions are between the point-of-view positions of the first parallax image sub group and a same in number as the number of pixels, and
perform control such that the display continuously displays the first parallax image sub group and the second parallax image sub group while alternately switching the first parallax image sub group and the second parallax image sub group at a predetermined switching speed while in the predetermined mode.

2. The image processing system according to claim 1, wherein the processing circuit performs control such that the first parallax image sub group and the second parallax image sub group are switched and displayed such that each of the parallax images included in the first parallax image sub group and the second parallax image sub group is displayed an arbitrary number of times for one second.

3. The image processing system according to claim 1, wherein the processing circuit classifies a plurality of parallax image sub groups obtained by classifying parallax images whose point-of-view positions are between the point-of-view positions of the first parallax image sub group into different parallax image sub groups as the second parallax image sub group, and performs control such that the first parallax image sub group and the parallax image sub groups included in the second parallax image sub group are sequentially switched and displayed.

4. The image processing system according to claim 1, wherein the processing circuit generates an interim image obtained by averaging pixel values of a plurality of parallax images included in either of the first parallax image sub group and the second parallax image sub group from the plurality of parallax images on a portion in which the point-of-view positions of a plurality of parallax images included in the first parallax image sub group and the point-of-view positions of a plurality of parallax images included in the second parallax image sub group are alternately continuous between the parallax image sub groups, and performs control such that the display displays the generated interim image instead of the plurality of parallax images while switching the interim image at a predetermined switching speed.

5. An image processing apparatus, comprising:
a display configured to display a stereoscopic image by arranging parallax images generated by performing a volume rendering process on volume data while sequentially changing a point-of-view position by a predetermined parallactic angle with a same number of pixels as a number of point-of-view positions, and outputting the arranged parallax images; and
a processing circuit configured to
generate different parallax images which are an integer multiple of the number of pixels by performing the volume rendering process on the volume data at point-of-view positions which are the integer multiple of the number of pixels when receiving an operation to change to a predetermined mode,
classify the generated different parallax images that are the integer multiple of the number of pixels into a first parallax image sub group to be a set of parallax images whose point-of-view positions are discontinuous to each other and a same in number as the number of pixels and a second parallax image sub group including a set of parallax images whose point-of-view positions are between the point-of-view positions of the first parallax image sub group and a same in number as the number of pixels, and
perform control such that the display continuously displays the first parallax image sub group and the second parallax image sub group while alternately switching the first parallax image sub group and the second parallax image sub group at a predetermined switching speed while in the predetermined mode.

6. An image processing method, comprising:
generating, by a processing circuit, different parallax images which are an integer multiple of the number of pixels by performing the volume rendering process on the volume data at point-of-view positions which are the integer multiple of the number of pixels when receiving an operation to change to a predetermined mode; and
classifying, by a processing circuit, the generated different parallax images which are the integer multiple of the number of pixels into a first parallax image sub group to be a set of parallax images whose point-of-view positions are discontinuous to each other and a same in number as the number of pixels and a second parallax image sub group including a set of parallax images whose point-of-view positions are between the point-of-view positions of the first parallax image sub group and a same in number as the number of pixels, and
performing control, by the processing circuit, such that a display that displays a stereoscopic image by arranging parallax images generated by performing the volume rendering process on the volume data while sequentially changing a point-of-view position by a predetermined parallactic angle with a same number of pixels as a number of point-of-view positions, and outputting the arranged parallax images, continuously displays the first parallax image sub group and the second parallax image sub group while alternately switching the first parallax image sub group and the second parallax image sub group at a predetermined switching speed while in the predetermined mode.

7. A medical image diagnosis apparatus, comprising:
a display configured to display a stereoscopic image by arranging parallax images generated by performing a volume rendering process on volume data while sequentially changing a point-of-view position by a predetermined parallactic angle with a same number of pixels as a number of point-of-view positions, and outputting the arranged parallax images; and a processing circuit configured to
- generate different parallax images which are an integer multiple of the number of pixels by performing the volume rendering process on the volume data at point-of-view positions which are the integer multiple of the number of pixels when receiving an operation to change to a predetermined mode,
- classify the generated different parallax images that are the integer multiple of the number of pixels into a first parallax image sub group to be a set of parallax images whose point-of-view positions are discontinuous to each other and a same in number as the number of pixels and a second parallax image sub group including a set of parallax images whose point-of-view positions are between the point-of-view positions of the first parallax image sub group and a same in number as the number of pixels, and
- perform control such that the display continuously displays the first parallax image sub group and the second parallax image sub group while alternately switching the first parallax image sub group and the second parallax image sub group at a predetermined switching speed while in the predetermined mode.

* * * * *